United States Patent [19]

Shikakura et al.

[11] Patent Number: 4,885,637
[45] Date of Patent: Dec. 5, 1989

[54] ENCODER

[75] Inventors: Akihiro Shikakura; Koji Takahashi; Masahiro Takei; Tomohiko Sasatani, all of Kanagawa, Japan

[73] Assignee: Canon Kabushiki Kaisha, Tokyo, Japan

[21] Appl. No.: 77,335

[22] Filed: Jul. 24, 1987

[51] Int. Cl.[4] .............................................. H04N 7/12
[52] U.S. Cl. .................................... 358/133; 358/135; 358/141
[58] Field of Search ............... 358/133, 136, 135, 141, 358/138, 260

[56]  References Cited

U.S. PATENT DOCUMENTS 4,691,233  9/1987  Acampora ..................... 358/135 X
4,734,768  3/1988  Pexa ................................. 358/135
4,757,383  7/1988  Tanaka .......................... 358/135 X
4,759,038  7/1988  Takahashi et al. ............. 358/135 X Primary Examiner—James J. Groody
Assistant Examiner—Victor R. Kostak
Attorney, Agent, or Firm—Robin, Blecker, Daley & Driscoll

[57]  ABSTRACT

An encoder is arranged to receive an image signal; to serially form sample signals by sampling the incoming image signal; to form coded data corresponding to the sample signals; and to convert an m number (m: an integer which is at least 2) of the coded data into data consisting of the same number of bits as the total number of bits of said m number of coded data. The arrangement enables the encoder to efficiently encode the image signal.

30 Claims, 19 Drawing Sheets

MODEL PATTERN

MEASURED VALUE

AXIS OF ORDINATE: FREQUENCY

MODEL PATTERN

MEASURED VALUE

AXIS OF ORDINATE: FREQUENCY (a) CLOCK PULSE (b) LATCHING PULSES

ENCODER

BACKGROUND OF THE INVENTION

1. Field of the Invention

This invention relates to a device for encoding an image information signal such as a TV signal and more particularly to an encoder which efficiently encodes an image signal through advantageous utilization of the characteristics of the signal.

2. Description of the Related Art

Apparatuses embodying known predictive encoding methods include, for example, a digital VTR, etc. In order to record on a recording medium, such as a magnetic tape, an image signal carrying a great amount of information, the apparatus of this kind has been arranged to accomplish recording by compressing an image data transmission band utilizing the correlativity of the image information.

It is difficult for an ordinary magnetic recording apparatus to record and reproduce a signal component of extremely low frequency and a DC component. The following description shows this in detail on the basis of the recording and reproducing principle of a digital VTR:

Recording and reproduction on and from a magnetic tape are performed via several magnetic heads mounted on a rotary cylinder. However, the magnetic head is generally arranged to perform recording or reproduction by converting the variations of a magnetic flux which take place with time (differential values) into voltages or by reversely carrying out the conversion. Therefore, it is difficult to reproduce DC and low frequency components of the signal. Besides, since the magnetic head incessantly revolves at a high speed, recording and reproduced signals are supplied and received to and from the magnetic head via a rotary transmitter or the like which is mounted on the above stated rotary cylinder. The rotary transmitter is, therefore, also hardly capable of transmitting the DC and low frequency components like the magnetic head. It is thus impossible to have the DC component of the signal transmitted.

To solve this problem, it is practiced not to straightly record band-compressed image data but to suppress the DC component thereof by scrambling it using a pseudo-random pattern before recording or reproduction. In this instance, however, the scrambled image data still contains the DC component in a small amount. Therefore, such a transmission system that consists of the magnetic head and the rotary transmitter and is incapable of transmitting the DC component inevitably gives many detection error in reproducing a DC component or a low frequency component. The increased rate of errors then results in deterioration of picture quality.

Further, various DC-free record modulating methods (such as an 8-10 block encoding method, an interleave NRZI method, etc.) of recording after modulation have been known. However, in the case of conversion without any DC component, like the 8-10 block encoding method, the rate of transmitting bits increases due to an increased degree of redundancy. Therefore, the methods of this kind hardly permit high density recording. In addition to this disadvantage, such modulating methods necessitates a complex process, which results in an increased amount of hardware.

To solve that problem, there has been proposed a predictive encoder as disclosed in U.S. Pat. Application Ser. No. 890,831, filed on July 25, 1986 and assigned to the assignee of the present invention. This encoder is arranged to be capable of suppressing the whole DSV (digital sum value) of the modulated signal by allotting a CDS (code-word digital sum) of a smaller value to a representative difference value which has a higher degree of appearing frequency. The details of this predictive encoder is as described below:

FIG. 1 of the accompanying drawings is a circuit diagram showing the above stated predictive encoder. Referring to FIG. 1, a subtracter 1 is arranged to subtract a predicted value signal P from an incoming image signal Di and to produce a prediction error signal E. A quantizer 2 is arranged to receive the prediction error signal E and to produce a data signal Do which consists of, for example, four bits as will be further described later. A representative value setter 3 is arranged to have a characteristic reverse to that of the quantizer 2. An adder 4 is arranged to add the signal output of a predictor 5 to a representative value signal R and to have the output thereof fed back to the input side of the predictor 5. The representative value setter 3, the adder 4 and the predictor 5 jointly form a local compositor 6 which is arranged to produce the prediction value signal P.

The input-output characteristic of the quantizer 2 is as shown in Table 1 below. Table 1 shows the level of the prediction error signal E in relation to the bit arrangement of the output data signal Do.

TABLE 1

| Prediction error E | Output bit pattern Do | CDS |
|---|---|---|
| 7 | 1111 | +4 |
| 6 | 0010 | −2 |
| 5 | 0111 | +2 |
| 4 | 0001 | −2 |
| 3 | 1101 | +2 |
| 2 | 0011 | 0 |
| 1 | °0101 | 0 |
| 0 | 0110 | 0 |
| −1 | 1010 | 0 |
| −2 | 1100 | 0 |
| −3 | 1011 | +2 |
| −4 | 1000 | −2 |
| −5 | 1110 | +2 |
| −6 | 0100 | −2 |
| −7 | 0000 | −4 |

In Table 1 above, each of values CDS indicates the total sum of bits within a single code obtained with the level "1" of the bit pattern at each bit in the output data signal Do assumed to be "+1" and the level "0" to be "−". The value of the CDS becomes zero when the sum of the value "1" is equal to that of the value "0".

The prediction error signal E is known to have a statistical nature that it has a large occurrence frequency distribution around "0" according to the correlativity of image information as shown in FIG. 2. In view of this, the predictive encoder is arranged to make code allotment to a range within which the value of the prediction error signal E is small in such a way as to make the absolute value of CDS small. Further, since the values of the prediction error signal E are symmetrically distributed around "0", the bit patterns of prediction error signals which are equal to each other in the absolute value are inversely allotted or arranged in the output data signal Do as shown in Table 1. The details of the inverse bit allotment of the bit patterns are as described below:

For example, while the output bit pattern is "1101" when the prediction error is "+3", the higher and lower bits are inversely allotted and to obtain a bit pattern of "1011" when the error is "−3". The bit pattern is "0010" for prediction error of "+6" and "0100" for an error of "−6". In the case of this specific example, however, bit pattern allotment is "1111" and "0000" for the maximum prediction error values of "+7" and "−7" respectively. Further, in the case of zero prediction error, the allotted bit pattern "0110" may be replaced with "1001".

As apparent from the above description, bit patterns of smaller absolute values of CDS are allotted to more frequently appearing values of the prediction error signal E around E=0. This arrangement enables the output data signal Do to have a less DC component.

FIG. 3 shows by way of example another known predictive encoder. Referring to FIG. 3, a subtracter 7 is arranged to subtract a prediction value signal P from an incoming image signal Di and to produce a prediction error signal E. A reference numeral 8 denotes a change-over switch. Numerals 9A and 9B denote first and second quantizers (Q1 and Q2). The first and second quantizers 9A and 9B (or Q1 and Q2) are arranged to give quantizing bit patterns as shown in Table 2 below:

TABLE 2

| Prediction error E | Q1 output | Q2 output | CDS |
|---|---|---|---|
| 7 | 1111 | 0000 | +4/−4 |
| 6 | 0010 | 0010 | −2 |
| 5 | 0111 | 0111 | +2 |
| 4 | 0001 | 0001 | −2 |
| 3 | 1101 | 1101 | +2 |
| 2 | 0011 | 0011 | 0 |
| 1 | 0101 | 0101 | 0 |
| 0 | 0110 | 0110 | 0 |
| −1 | 1010 | 1010 | 0 |
| −2 | 1100 | 1100 | 0 |
| −3 | 1011 | 1011 | +2 |
| −4 | 1000 | 1000 | −2 |
| −5 | 1110 | 1110 | +2 |
| −6 | 0100 | 0100 | −2 |
| −7 | 1001 | 1001 | 0 |

Referring further to FIG. 3, an up-down counter 10 is arranged to up count the output data signal Do when the signal Do is at "1" and to down count it when it is at "0". A reference numeral 11 denotes a change-over switch. First and second representative value setters 12A and 12B (or R1 and R2) are arranged to have characteristics which are reverse to those of the first and second quantizers 9A and 9B respectively. A numeral 13 denotes an adder and a numeral 14 a predictor.

As apparent from Table 2 above, the first and second quantizers 9A and 9B differ from each other in that: They are arranged to produce the output data signal Do in different bit patterns of "1111" and "0000" when the prediction error is "7". As for all other prediction error values "+6" to "−7", the two quantizers produce exactly the same bit pattern. The change-over switches 8 and 11 are arranged to have their connecting positions on their sides A to select the first quantizer 9A and the first representative value setter 12A when sign bit information from the up-down counter 10 indicates the negative sign and on their sides B to select the second quantizer 9B and the second representative value setter 12B when it indicates the positive sign.

This encoder operates as follows: For the sake of illustration, the connecting positions of change-over switches 8 and 11 are assumed to be on their sides A. As shown by the distribution curve of FIG. 2, it is likely that the prediction error signals E are symmetrically distributed in both the positive and negative directions. When the prediction error signal E which is of such distribution is supplied to the first quantizer 9A (Q1), the probability of consecutively having "1" in the output bit pattern becomes larger than that of consecutively having "0". Therefore, the up-down counter 10 more often up counts. As a result, the sign bit of the output comes to indicate the positive sign.

When the sign bit of the up-down counter 10 comes to show the positive sign, the second quantizer 9B (or Q2) and the second representative value setter 12B (or R2) are selected by the change-over switches 8 and 11. The second quantizer 9B (or Q2) then performs a quantizing action. By this, the output bit pattern shifts to a pattern in which the probability of consecutively having "1" exceeds the probability of consecutively having "0". The up-down counter 10 then comes to down count. The encoder thus comes to perform a feedback action. The feedback action makes the probability of having "0" in the output data signal Do equal to that of having "1", so that a code train which is free from a DC component can be obtained.

The predictive encoders of the prior art which are arranged as described above is capable of forming a coded signal by suppressing the DSV on the basis of the appearing frequency of the prediction errors. However, in handling an image signal of a high sampling rate such as a high definition TV signal, the DC suppression and the encoding efficiency must be furthered for overall compression of the transmission band.

SUMMARY OF THE INVENTION

It is a general object of this invention to provide an encoder which is capable of solving the above stated problems of the encoders of the prior art.

It is a more specific object of this invention to provide an encoder which is capable of efficiently encoding an image signal.

Under this object, an encoder which is arranged as an embodiment of this invention to encode an image signal by digitizing the signal comprises: sample signal forming means for forming sample signals by receiving and serially sampling the image signal; coded data forming means arranged to form and produce coded data which correspond to the sample signals formed by the sample signal forming means; and data conversion means arranged to convert an m number (m: an integer which is at least 2) of coded data produced from said coded data forming means into data consisting of the same number of bits as the total number of bits of the m number of coded data.

It is another object of this invention to provide an encoder which is capable of encoding, despite of a simpler structural arrangement than the encoders of the prior art, an image signal with a high suppressing effect on the low frequency component of the image signal.

Under that object, an encoder which is arranged according to this invention as an embodiment thereof to encode an image signal by digitizing the signal comprises: sample signal forming means for forming sample signals by receiving and serially sampling the image signal; difference coded data forming means arranged to form a difference value signal representing a difference between adjacent sample signals formed by the sample signal forming means and to form difference coded data by quantizing and encoding the difference value signal; and data conversion means arranged to convert an m number (m: an integer which is at least 2) of the difference coded data produced from the difference coded data forming means into data which consists of the same number of bits as the total number of bits of the m number of difference coded data according to the characteristic of the image signal.

It is a further object of this invention to provide an encoder which is capable of, despite of a simple structural arrangement, encoding an image signal into a code having a low error rate on a transmission line.

Under that object, an encoder which is arranged according to this invention as an embodiment thereof to digitize and encode an image signal comprises: sample signal forming means for forming sample signals by receiving and serially sampling the image signal; coded data forming means arranged to form and produce coded data corresponding respectively to the sample signals formed by the sample signal forming means; data conversion means arranged to convert an m number (m: an integer which is at least 2) of coded data produced from the coded data forming means into a first data consisting of the same number of bits as the total number of bits of the m number of coded data; DSV detection means arranged to detect variations in the digital sum value (DSV) of a series of the first data produced from the data conversion means; and DSV control means arranged to replace, according to the result of detection made by the DSV detection means, the first data having a predetermined bit pattern with second data which has the same number of bits as the first data but differs in bit pattern from the first data and to produce the second data instead of the first data.

Other objects and features of the invention will become apparent from the following detailed description of embodiments thereof taken in connection with the accompanying drawings.

DETAILED DESCRIPTION OF THE PREFERRED EMBODIMENTS

Figure 4:
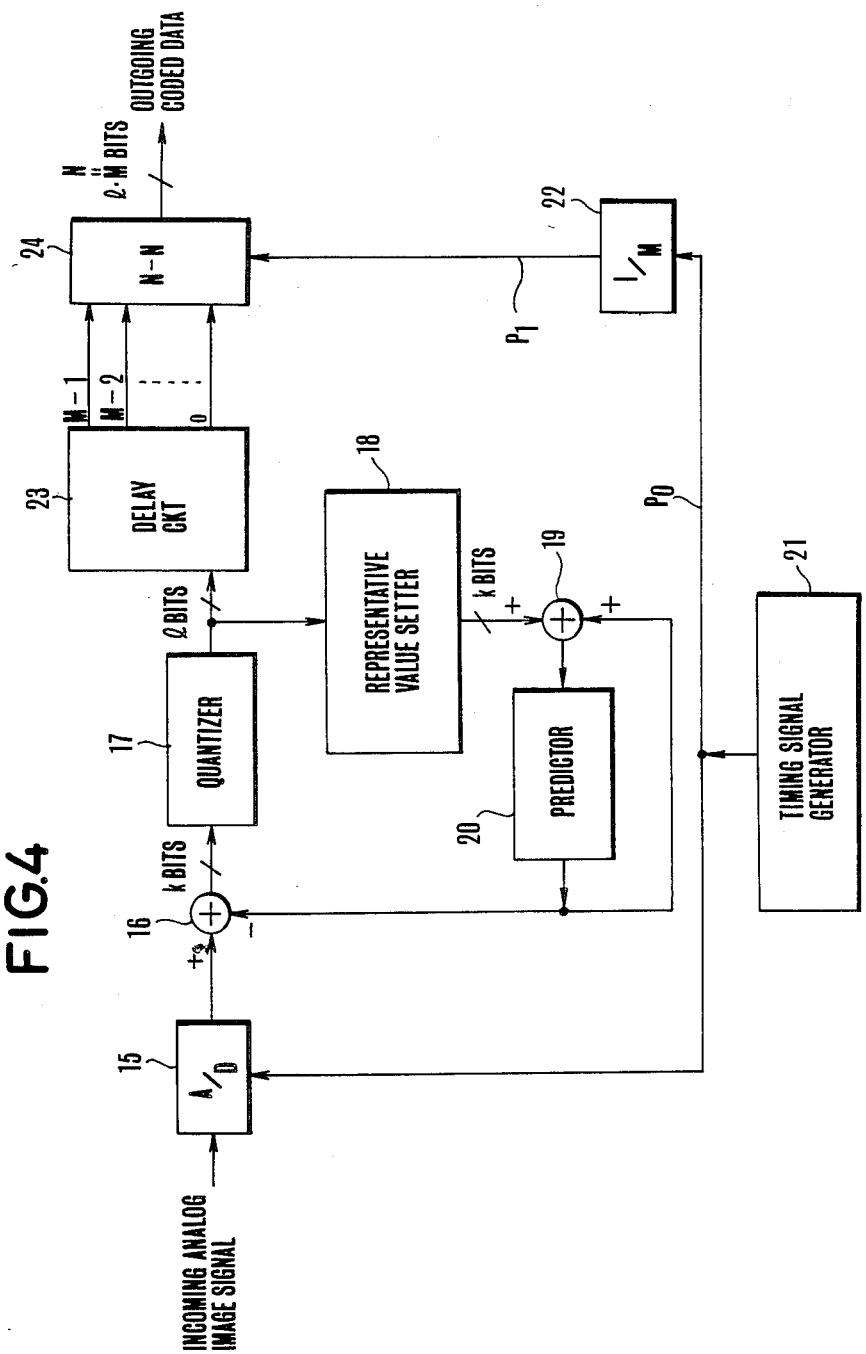
FIG. 4 is a block diagram showing a predictive encoder arranged as a first embodiment of this invention.
Figure 7:
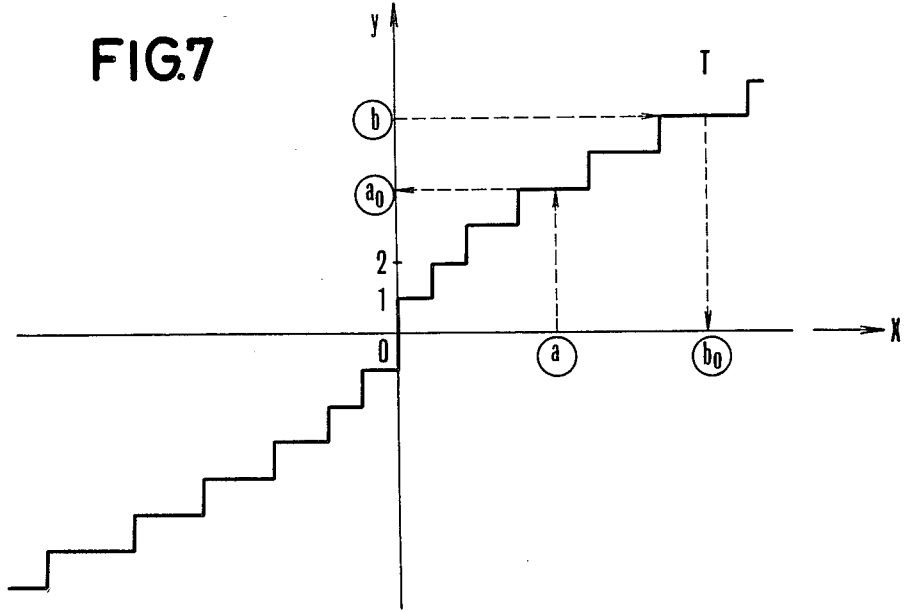
FIG. 7 is a graph showing the non-linear-quantizing and representative-value-setting characteristics of a quantizer and a representative value setter included in the predictive encoder of FIG. 4.

FIG. 4 shows the basic arrangement of a first embodiment of this invention. Referring to FIG. 4, an A/D converter 15 is arranged to receive an analog image signal and to convert it into a digital image data of k bits. The digital image data is supplied to a subtracter 16. To the inverting input terminal of this subtracter 16 is supplied an image data which is produced one sampling step before from a predictor 20 and is supplied to the subtracter 16 as predicted image data. The subtracter 16 performs a subtracting operation and produces difference data of a k number of bits representing a difference between a present sample of image data and a preceding sample of image data. The difference data of k bits from the subtracter 16 is supplied to a quantizer 17. The quantizer 17 performs non-linear quantization by utilizing the characteristic of the image signal. This quantizer 17 my be the non-linear quantizer mentioned in the foregoing with reference to FIG. 1 or may be any ordinary known non-linear quantizer. By this non-linear quantization, the difference data of k bits is compressed to a difference data of l bits (l<k). The difference data of l bits produced from the quantizer 17 is divided into two. One is supplied to a delay circuit 23. The other is supplied to a representative value setter 18 and is used for forming a prediction value. The representative value setter 18 is arranged to perform a converting operation in a manner reverse to the operation of the quantizer 17. The detail of these converting operations are as described below with reference to FIG. 7:

The difference data a of k bits which is on an axis X and supplied by the quantizer 17 is first converted into the difference data $a_0$ of l bits according to a conversion coefficient characteristic T. By this, non-linear quantization is carried out. Some quantization error arises at this point of time. To prevent this quantization error from being accumulated, the representative value setter 18 performs a converting operation in a manner reverse to the operation of the quantizer 17. The setter 18 then produces decoded difference data of k bits. Then, on the basis of the decoded difference data, the subtracter 16 performs its subtracting operation to obtain a difference value representing a difference between a next sample of image data and a previous sample of output image data which is formed jointly by an adder 19 and the predictor 20 and includes some quantization error. This arrangement effectively prevents the above stated quantization error from being accumulated. With the embodiment arranged in this manner, it operates as follows:

When difference data b of l bits is produced from the quantizer 17, the representative value setter 18 obtains, according to the conversion coefficient characteristic T at a point "b" on the axis "y", a value "bo" on the axis "x" as the decoded difference data of k bits. This operation is performed in a manner exactly reverse to the quantization operation.

Figure 8:
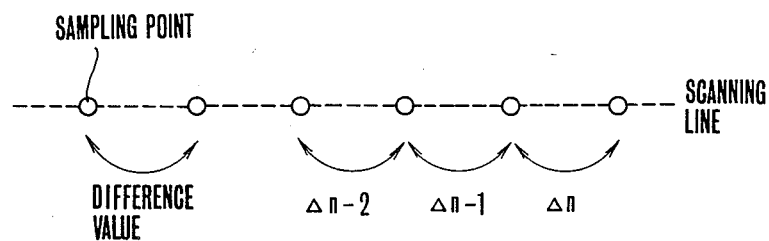
FIG. 8 shows the relation of sampling points to difference value signals obtained by the predictive encoder of FIG. 4.

Assuming that the predictor 20 is arranged to be a delay circuit for delaying one sampling period, for the sake of simplification, an output image data obtained one sampling period before the present image data sample is supplied to one of the input terminals of the adder 19. Then, since the above stated decoded difference data is supplied to the other input terminal, the output terminal of the adder 19 produces data of information which is the same as information obtained by decoding the present sample of the output image data. The data from the output terminal of the adder 19 is delayed one sampling period by the predictor 20 and is then supplied to the inverting input terminal of the subtracter 16. The difference value is thus obtained at every sampling. The relation of the difference values to sampling points are as shown in FIG. 8. Referring to FIG. 8, in obtaining image sample data by sampling the image information on each scanning line, a difference value obtained at the present sampling point is indicated as $\Delta n$ while the difference values obtained at preceding sampling points are indicated as $\Delta n-1$ (one sampling period before), -----.

Figure 5:
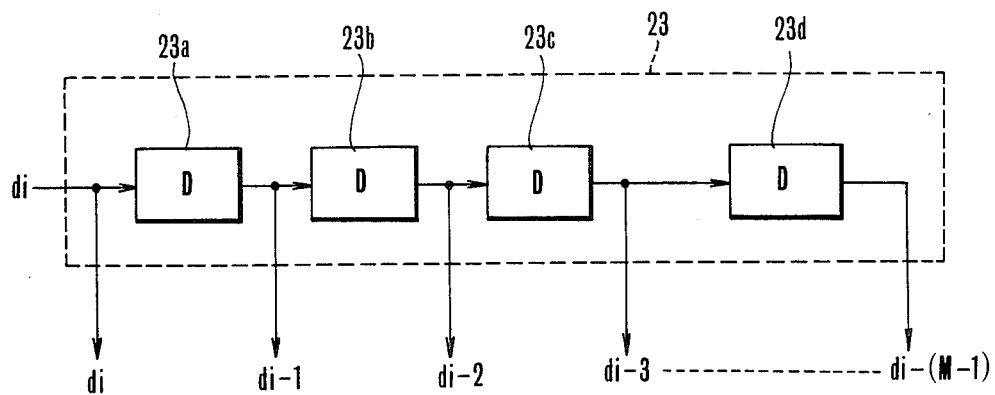
FIG. 5 is a diagram showing the arrangement of a delay circuit included in the predictive encoder shown in FIG. 4.
Figure 6:
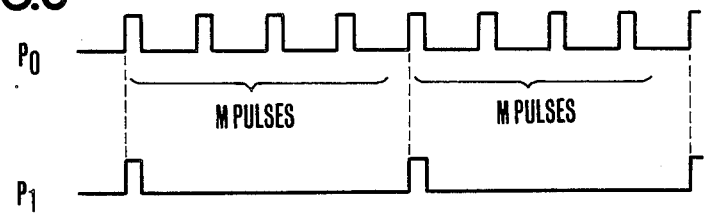
FIG. 6 is a timing chart showing clock pulses used for controlling the operation of the predictive encoder of FIG. 4.

Again referring to FIG. 4, the delay circuit 23 which is arranged to receive, from the quantizer 17, the difference data in units of l bits is arranged as follows: The delay circuit 23 groups an m number of samples of the difference data which comes in consecutive units of l bits into data of a N number of bits and is arranged to N—N (or N—to—N) convert it as will be described later. For this purpose, the delay circuit 23 is composed of delay circuit elements 23a to 23d as shown in FIG. 5. Each of the delay circuit elements 23a to 23d is arranged to delay one sample portion of the difference data. The elements 23a to 23d are series connected in M-1 steps to form the delay circuit 23. When the M number of difference data which are obtained by delaying them as much as one sample period one after another are produced from the output terminals d1 to dl(m-1) of the circuit 23, they are N—N converted by an N—N converter 24. The N—N converter 24 is arranged to receive a pulse signal obtained from a 1/M frequency divider 22 by frequency dividing by M the clock pulse signal of a timing signal generator 21 which controls the operation of the A/D converter 15. The N—N converter 24 performs an N—N converting process on the basis of the pulse signal coming from the 1/M frequency divider 22. The timing of the N—N conversion is as shown in a timing chart in FIG. 6. One pulse of a pulse signal P1 is generated at every M number of pulses of a clock pulse signal P0. The N—N converter 24 performs the N—N conversion process in synchronism with the pulses of the pulse signal P1. During one performance of the process, output data of N bits (N=l·M) is obtained from the converter 24.

Figure 1:
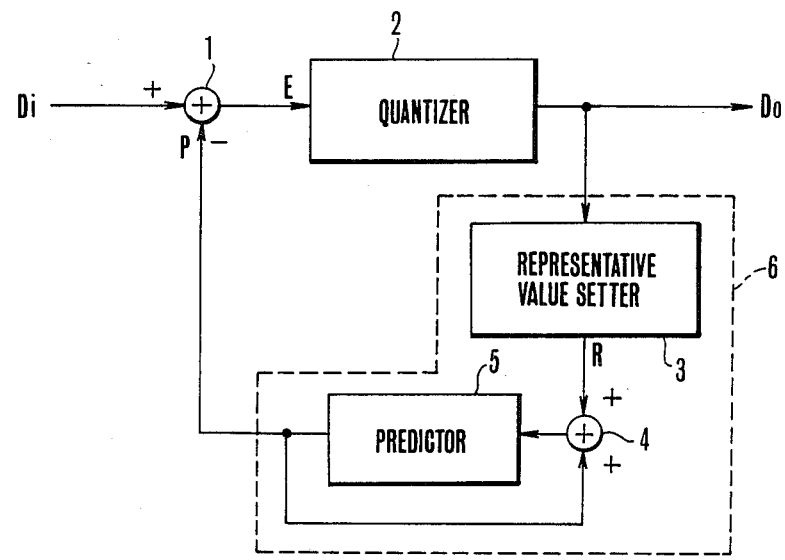
FIG. 1 is a block diagram showing an example of the conventional predictive encoder.
Figure 2:
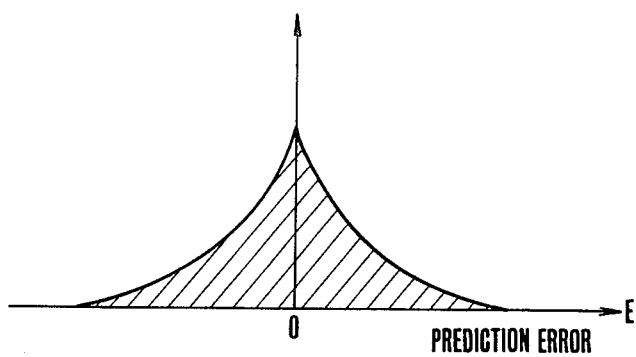
FIG. 2 shows the appearing frequency distribution of prediction error signals.
Figure 3:
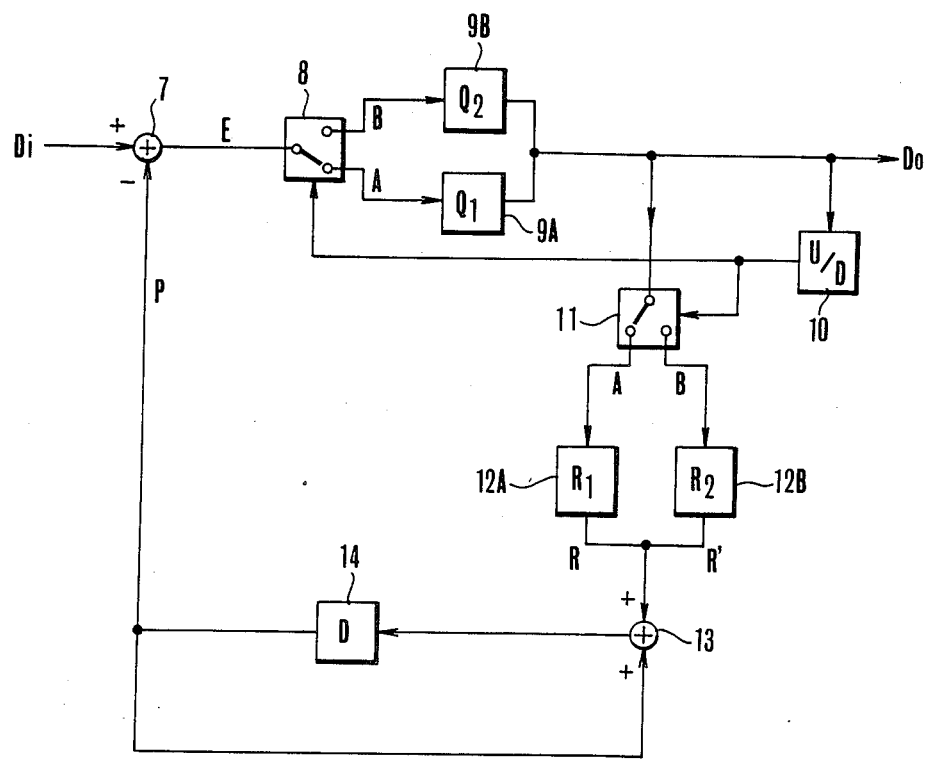
FIG. 3 is a block diagram showing another example of the conventional predictive encoder.
Figure 9A:
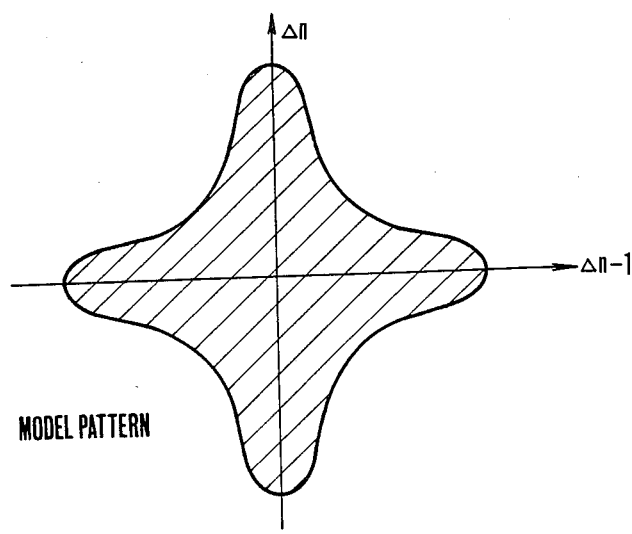
FIGS. 9(a) and 9(b) are two-dimensional illustrations of difference value distribution characteristic of the predictive encoder of FIG. 4.

The details of the N—N conversion process to be performed by the N—N converter 24 are as follows:

The N—N conversion is performed for the purpose of converting the data of N bits into N bit data having very little amounts of DC and low frequency components by further emphasizing the characteristic of image information which cannot be sufficiently emphasized by the prior art predictive encoders shown in FIGS. 1 and 3. The characteristic of this N—N conversion is as described below with reference to FIGS. 8, 9(a), 9(b) and 10:

For the sake of simplification of description, the number M is assumed to be 2 and two consecutive sampling points to be handled as one unit. As shown in FIG. 8, the difference values $\Delta n$ and $\Delta n-1$ between two consecutive sample points are computed and obtained from the sampled image data. The occurrence distribution of these difference values can be two-dimensionally illustrated as shown in FIG. 9(a). In FIG. 9(a), the difference value $\Delta n$ is linearly indicated on the axis of ordinate and the difference value $\Delta n-1$ on the axis of abscissa. A hatched area which includes an origin indicates a converged state of the occurrence distribution of these difference values in combination with each other. The arrangement to pair the two difference values gives a higher degree of convergence to permit more efficient encoding than an arrangement which individually encodes the difference value data. Since the combination of the difference values $\Delta n$ and $\Delta n-1$ frequently occurs within an area represented by the hatched part of FIG. 9(a), the image data can be encoded with fidelity with the quantizer 17 of FIG. 4 arranged to have such a non-linear quantization characteristic that finely defines quantizing steps for the difference value obtained within this area.

Figure 10:
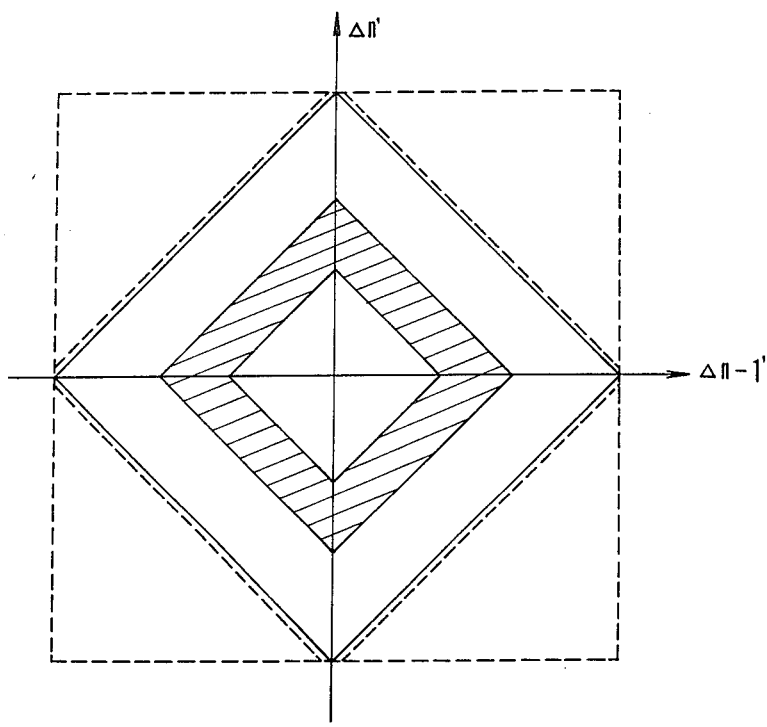
FIG. 10 is a two-dimensional illustration of the quantized difference value distribution characteristic of the same encoder showing quantized difference values obtained by non-linearly quantizing the difference values included in the distribution shown in FIG. 9(b).
Figure 9B:
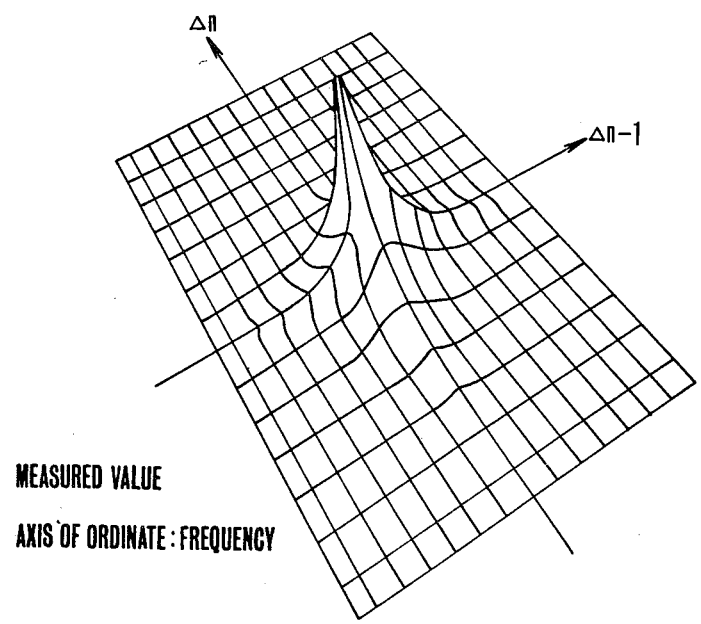

Further, with the appearing frequency of the difference values $\Delta n$ and $\Delta n-1$ plotted in the vertical direction, the appearing frequency of the consecutive difference values $\Delta n$ and $\Delta n-1$ converges into a mountain-like shape round a zero point (or the origin) as indicated in FIG. 9(b). Further, with the difference values which are distributed as shown in FIG. 9(a) non-linearly quantized to obtain quantized difference values, the distribution of the quantized error values can be two-dimensionally expressed, for example, as shown in FIG. 10. There is a tendency that, a hatched part of FIG. 10 represents an area in which the largest value of appearing frequency for each of the steps of the non-linear quantizing action on the above stated difference values. In view of this, if the N—N converter 24 of the kind having a memory for retaining conversion data, the memory is arranged to retain conversion data consisting of the same number of bits as the incoming data of N bits. In other words, with respect to two quantized difference value data (of N bits) which corresponds to the combination of the quantized difference values $\Delta n'$ and $\Delta n-1'$ included in the hatched part of FIG. 10, conversion data (N bits) which has a small absolute value of CDS is allocated giving the highest priority thereto. With respect to other parts, the tendency of the appearing frequency for one of the steps of the non-linear quantizing action on the difference values is likewise examined. Then, the conversion data of small absolute values of CDS are allotted to the quantized difference values one after another in the order of larger appearing frequency among them. Further, in FIG. 10, peripheral parts defined by broken lines represents areas wherein, in respect to the occurrence distribution of the consecutive difference values $\Delta n$ and $\Delta n-1$, the quantized difference value data either never occurs or very rarely occurs in combination. In short, it suffices to have the conversion data prepared in varied kinds only for the combination of difference values $\Delta n$ and $\Delta n-1$ distributed within areas other than the areas defined by broken lines as shown in FIG. 10. Therefore, the required number of the kinds of conversion data can be lessened. Then, with data of small absolute values of CDS selected from among the varied kinds of the conversion data, the conversion can be carried out with a high suppressing effect on the DC and low frequency components.

The N—N converter 24 is thus arranged to be capable of giving coded data which is efficiently controlled to have no redundant bits.

Figure 11:
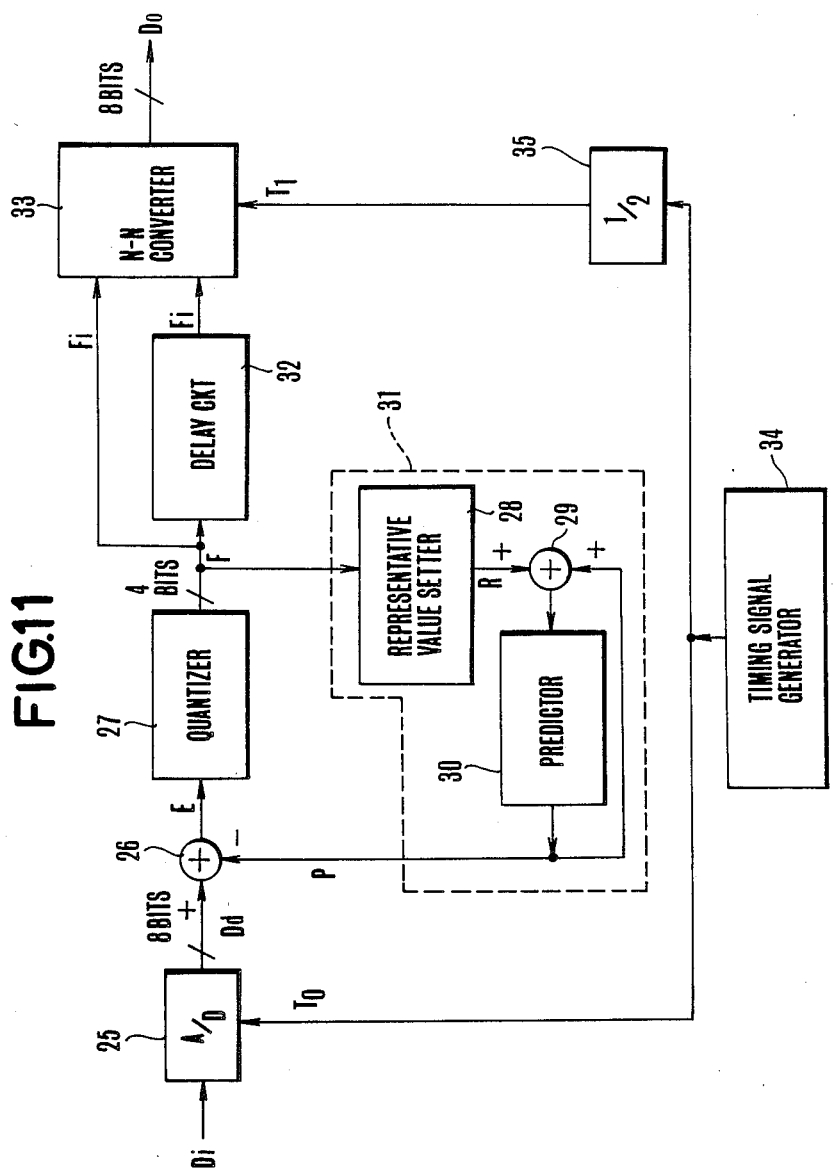
FIG. 11 is a block diagram showing a predictive encoder arranged according to this invention as a second embodiment thereof.
Figure 12:
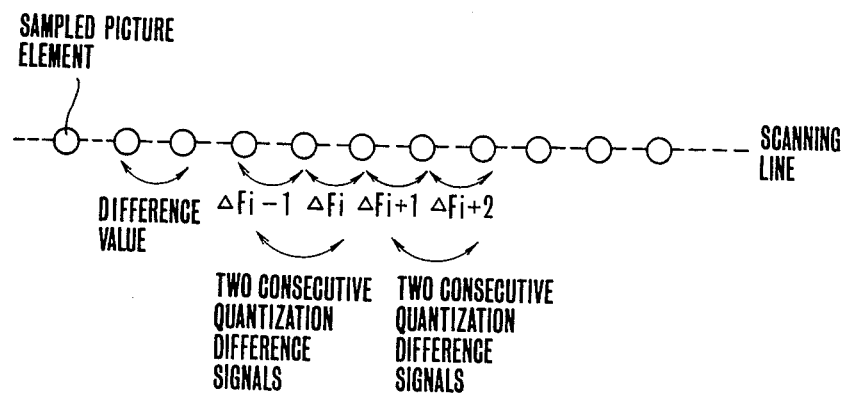
FIG. 12 shows a method for sampling two consecutive quantization difference signals obtained by the encoder of FIG. 11.

FIG. 11 shows in outline the arrangement of a predictive encoder embodying this invention as a second embodiment thereof. The second embodiment is arranged to make two consecutive four-bit quantized difference value signals into an eight-bit coded signal. The term two consecutive quantized difference value signals as used for the embodiment means, in terms of sampling points, two signals which are obtained by quantizing a present difference value Fi and another difference value Fi−1 which is sampled one sampling period before the present sampling point as shown in FIG. 12.

Referring to FIG. 11, an incoming analog image signal Di is supplied to an A/D converter 25 to be converted into 8-bit image data Dd per sampling step. The 8-bit image data Dd is supplied to a subtracter 26. Meanwhile, a local compositer 31 which will be described later supplies also the subtracter 26 with predicted value image data P which is image data obtained one sampling period before the present sampling step. The subtracter 26 subtracts the predicted value image data P from the image data Dd and produces an 8-bit prediction error data E therefrom. In other words, the subtracter 26 is arranged to perform a difference obtaining operation on the present sample vale and the previous sample value.

The prediction error data E is supplied to a quantizer 27, which then performs a non-linear type quantizing process using the characteristic of the image signal which will be described later. By this non-linear type quantization, the 8-bit prediction error data E is converted into 4-bit quantized difference value data F.

Figure 13:
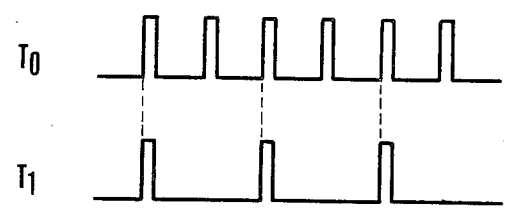
FIG. 13 is a timing chart showing clock pulses to be used for controlling the operation of the predictive encoder of FIG. 11.

The quantized difference value data F produced from the quantizer 27 is divided into two for two channels. One is supplied to an output stage which will be described later while the other is supplied to the local compositor 31. The local compositor 31 consists of a representative value setter 28 which has a characteristic opposite to that of the quantizer 27; a predictor 30; and an adder 29 which is arranged to add the predicted value image data P produced from the predictor 30 to representative value data R produced from the representative value setter 28 and to perform an integrating function by feeding the sum thus obtained back to the input terminal of the predictor 30. The compositor 31 is thus arranged to supply the predicted value image data P to an adder 26. The operation of the local compositor 31 is similar to the corresponding circuit element described in the foregoing with reference to FIG. 1. Therefore, the details of the compositor is omitted in the following description:

When the quantized difference value data F which is forwarded to the output stage comes to a delay circuit 32, the delay circuit 32 produces quantized difference value data F1−1 which is previously obtained and has been delayed by one sampling period. As a result, there obtain two consecutive quantized difference value data including the data F1−1 and the data F1 which is not delayed. These two 4-bit quantized difference value data F1 and F1−1 are supplied together to an N—N converter 33 which is provided with a conversion memory table. The converter 33 then performs 8-bit encoding and produces output data Do. A clock pulse signal To is produced from a timing signal generator 34 and is supplied to the A/D converter 25 to control the operation of the converter 25. A pulse signal T1 which is obtained by frequency dividing the clock pulse signal To through a ½ frequency divider 35 is supplied to the N—N converter 33. The N—N converter 33 thus performs its converting process in accordance with the period of this pulse signal T1. FIG. 13 shows it in a timing chart.

Figure 14A:
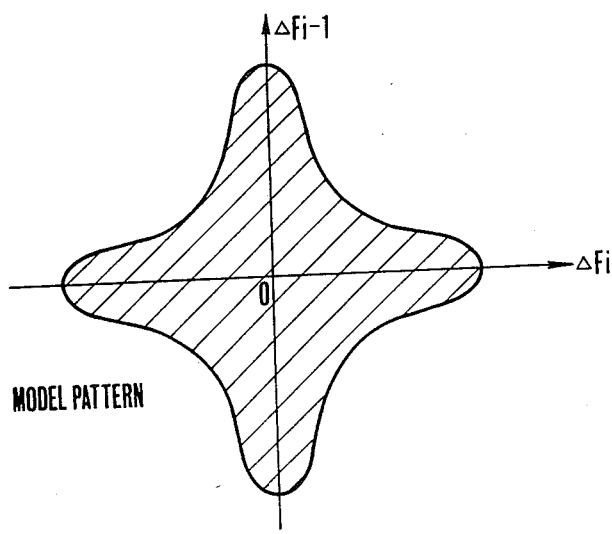
FIGS. 14(a) and 14(b) are two-dimensional illustrations of the difference value distribution characteristic of the encoder of FIG. 11.
Figure 14B:
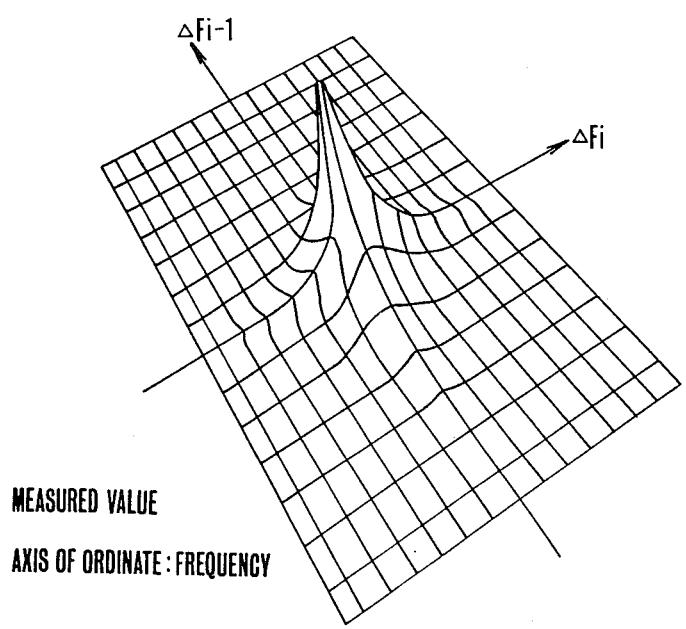
Figure 15:
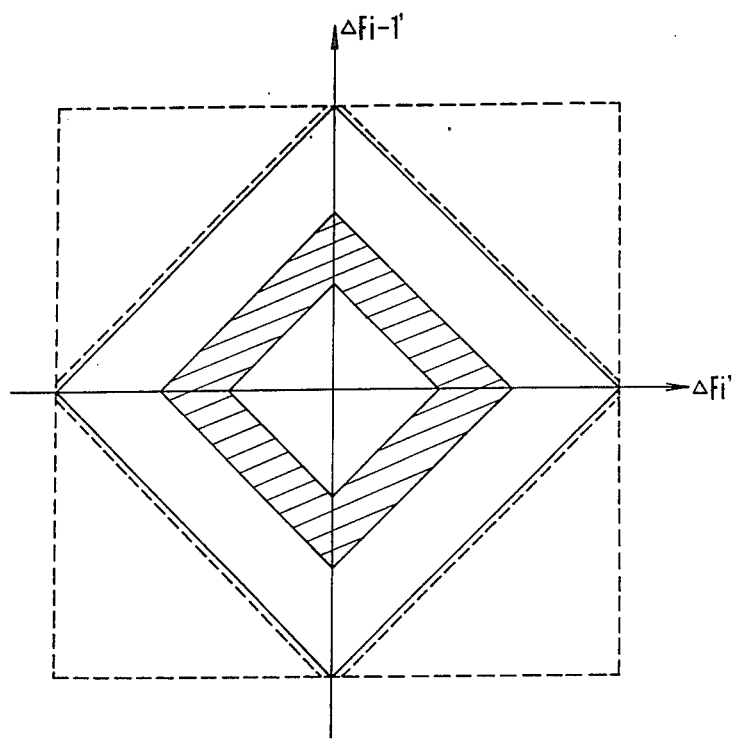
FIG. 15 is a two-dimensional illustration of the quantized difference value distribution characteristic of the same encoder showing quantized difference values obtained by non-linearly quantizing the difference values included in the distribution shown in FIG. 14(b).

While the N—N converter 33 is arranged to perform the converting process as described above, a manner in which 8-bit coded data is allotted to the two consecutive 4-bit quantized difference value data is as follows:

With image data sampled in a manner as shown in FIG. 12, the two consecutive difference values $\Delta Fi$ and $\Delta Fi-1$ computed from the image data are obtained and distributed as two-dimensionally shown in FIG. 14(a). In FIG. 14(a), the difference value $\Delta Vi-1$ is linearly shown on the axis of ordinate and the difference value $\Delta Fi$ on the axis of abscissa. As indicated by a hatched part of FIG. 14(a), the combination of the difference values $\Delta Fi-1$ and $\Delta F$ converges into or concentrate on an area including the origin. Since the combination of the difference values $\Delta Fi-1$ and $\Delta Fi$ as plotted within the hatched part is most frequently obtained, image data can be encoded with fidelity with the quantizer 27 of FIG. 11 arranged to have such a non-linear type quantization characteristic that has finely divided quantizing steps for the difference values obtained within this area. Further, with the difference value $\Delta Fi-1$ on the axis of ordinate and the difference value $\Delta Fi$ on the axis of abscissa non-linearly indicated, if the appearing frequency of these difference values is expressed in addition to the two-dimensional illustration, the consecutive difference values $\Delta Fi \times 1$ and $\Delta Fi$ converges into a high mountain-like shape as shown in FIG. 14(b) with the zero point (origin) in the middle thereof. FIG. 15 shows the appearing frequency distribution of FIG. 14(b) in a two-dimensional state, which is obtained by dividing the frequency distribution into areas with boundaries between them determined in such a way as to make the total of appearing frequencies within each of the divided areas equal to that of another area.

In FIG. 15 which shows the areas divided by boundary lines, a hatched part tends to correspond to an area wherein the total value of the appearing frequency for each of the steps of the non-linear quantizing process on the difference values becomes the highest. Therefore, the N—N converter 33 is arranged to have coded data which consists of the same number of bits as that of the incoming data kept at the conversion memory table within the converter 33 in such a way as to give outgoing coded data having the same number of bits as the incoming data of N bits (which is 8 in this specific embodiment). In other words, coded data (8 bits) of a small absolute value of CDS is allotted with the highest priority to the two difference data (8 bits) corresponding to the combination of difference values $\Delta Fi-1$ and $\Delta Fi$ included in the hatched part of FIG. 15. As for other parts, the tendency of the appearing frequency for each of the steps of the non-linear quantizing process on the difference values is likewise examined. Then, the conversion data of smaller absolute values of CDS are allotted to the quantized difference values one after another in the order of larger appearing frequencies.

More specifically, with a digital modulator provided in the rear state of the N—N converter 33 which is arranged to perform N—N conversion as described above, if the modulator is arranged to perform its modulating action by NRZ, for example, a bit pattern having the CDS value at "0", such as "01010101" is allotted with high priority to a part having the highest appearing frequency as shown in Table 3. After that, bit patterns of the CDS values $\pm 2$, $\pm 4$, $\pm 6$ and $\pm 8$ are allocated one after another in the order of their appearing frequencies. By this arrangement, the coded data output Do can be produced with only a small DC component included therein.

TABLE 3

| Block volume value | CDS value | Bit pattern | Number of bit patterns | | |
|---|---|---|---|---|---|
| large | 0 | 01010101, etc | 70 kinds | 70 kinds | |
| ↑ | 2 | 11111000, etc | 56 kinds | 112 kinds | |
| | | 11100000, etc | 56 kinds | | |
| | 4 | 11111100, etc | 28 kinds | 56 kinds | |
| | | 11000000, etc | 28 kinds | | 256 kinds |
| | 6 | 11111110, etc | 8 | 16 kinds | |
| | | 10000000, etc | 8 | | |
| ↓ | 8 | 11111111 | 1 | 2 kinds | |
| small | | 00000000 | 1 | | |

Figure 16:
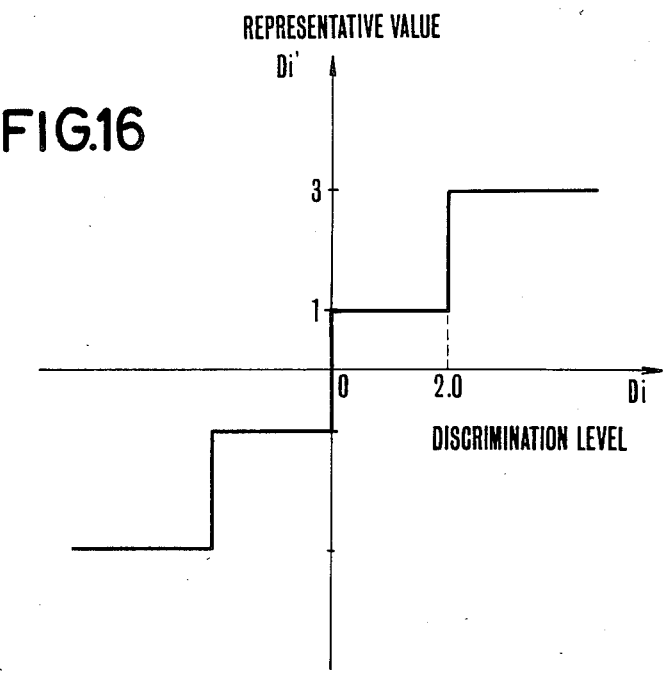
FIG. 16 shows the mid-riser type representative value setting characteristic of a representative value setter.

The quantizer 27 of this embodiment is arranged to perform non-linear quantization of the mid-tread type. A difference between the mid-riser type and the mid-tread type is as follows: FIG. 16 shows the mid-riser type, wherein: In relation to an incoming data Di, positive and negative representative values Di' are set across a point Di=0. Quantization is carried out by correlating the incoming data with an even number of representative values.

In the case of the mid-riser type quantizing method, the quantized difference value data F which is produced from the quantizer 27 is denoted by 16 different 4-bit signals. Therefore, in case where two consecutive 4bit quantized difference value data F are to be paired or combined into an 8-bit signal, the outgoing coded data Do is produced in 256 different states. This permits use of all the bit patterns that are denotable in eight bits.

In this instance, even if the method of allocating bit patterns one after another beginning with a smaller absolute value of them to the difference values one after another in the order of larger appearing frequency values is employed as mentioned in the foregoing, a bit pattern having the maximum absolute value of CDS would eventually come to be used. This is disadvantageous in terms of reduction in the DC component.

Figure 17:
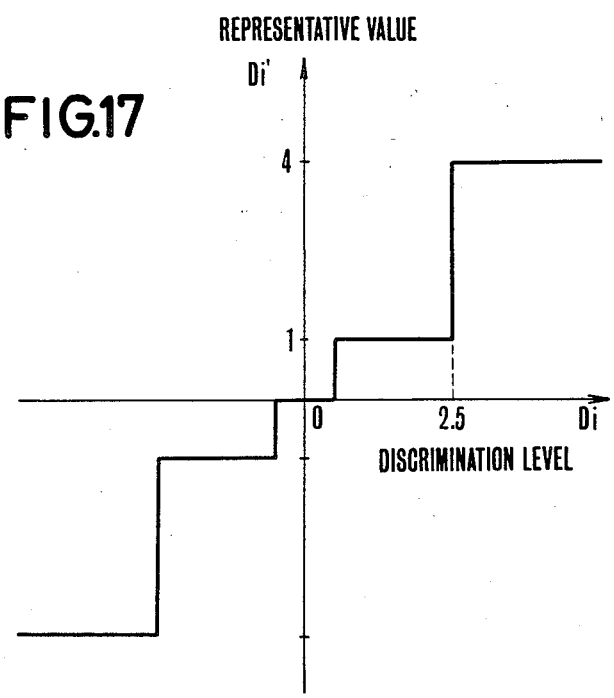
FIG. 17 shows the mid-tread type representative value setting characteristic of a representative value setter.
Figure 18:
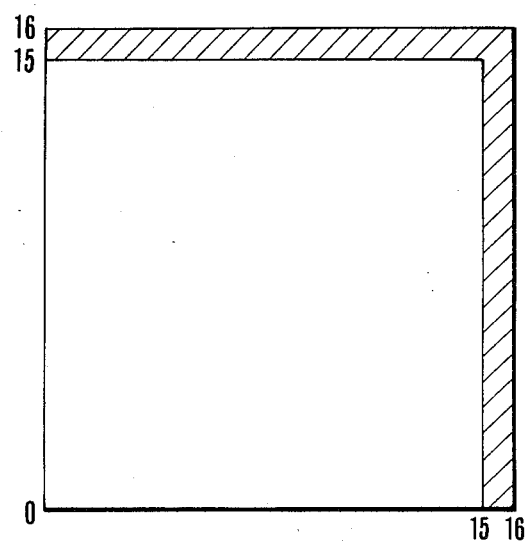
FIG. 18 is a conceptional view showing that some of the bit patterns of digital image data can be excluded from bit allotment at the time of data conversion with the mid-tread type representative value setting characteristic employed for the representative value setter of the predictive encoder of FIG. 11.

In the case of the mid-tread type, there obtains a representative value Di'=0 in the neighborhood of the incoming data Di=0 as shown in FIG. 17. In this case, the incoming data signal is correlated with an oddnumber of representative values. With the mid-tread type quantizing method employed, the quantized difference value data F produced from the quantizer 27 is denotable by 15 different 4-bit signals. Therefore, the number of kinds of the outgoing coded data Do of FIG. 11 is reduced to 225 ($15 \times 15$). Among the total number of 256 kinds of bit patterns denotable in eight bits, the 31 kinds of bit patterns having larger absolute value of CDS are excludable from code allotment. FIG. 18 shows this. Referring to FIG. 18, the axis of ordinate shows the number of bit patterns of the quantized difference value data Fn−1 while the axis of abscissa shows that of the quantized difference value data Fn. As shown, among the total number of bit patterns denotable in eight bits, 31 bit patterns which is indicated by a hatched part can be excluded. Therefore, as shown in Table 3, the outgoing data signal is denotable using only the 8-bit patterns that are not exceeding 4 in absolute value of CDS. The embodiment is thus arranged to be capable of producing the coded data Do containing not much DC component therein.

While the quantized difference value data F consists of four bits in the case of the embodiment described in the foregoing, the arrangement of this embodiment is likewise applicable to different cases where the data consists of an n number of bits instead of four. In that event, among the bit patterns that are denotable with 2n (=N) bits, a $2^{n+1}+1$ number of bit patterns having larger absolute values of CDS can be excluded from code allotment in producing the coded data output.

As described above, the embodiment is capable of producing DC-free data without recourse to a complex modulation circuit, etc. The outgoing train of coded bit patterns can be liberated from DC components by simply rewriting the conversion memory table to be used in encoding for DPCM (differential pulse code modulation). Further, with the mid-tread type quantizing method employed, the two consecutive n-bit quantized difference value data is turned into coded data of 2n bits in such a way as to have bit patterns of larger absolute values of CDS excluded from code allotment. Another advantage of the embodiment resides in that: In converting the two consecutive n-bit quantized difference value data into coded data of 2n bits, code patterns of small absolute values of CDS are arranged to be allotted to an area where combinations of difference values appear at a high rate of frequency. This arrangement enables the image signal to be encoded in a state of having its DC and low frequency components suppressed.

Further, in this embodiment, two consecutive 4-bit quantized difference value data or signals are arranged to be converted into an 8-bit coded signal. However, this invention is applicable also to a case where an m number of consecutive n-bit quantized difference value signals are to be converted into a coded signal of m×n bits with a plurality of delay circuits suitably arranged. Such applications enhance the suppressing effect attainable in accordance with this invention on the DC and low frequency components.

The above stated reduction in the DC component of the coded data output gives another advantage in that a clock signal component can be readily extracted during a decoding process. Further, in recording and reproducing the coded data output, the invented arrangement lowers the rate of errors due to the DC component of the data.

Figure 19:
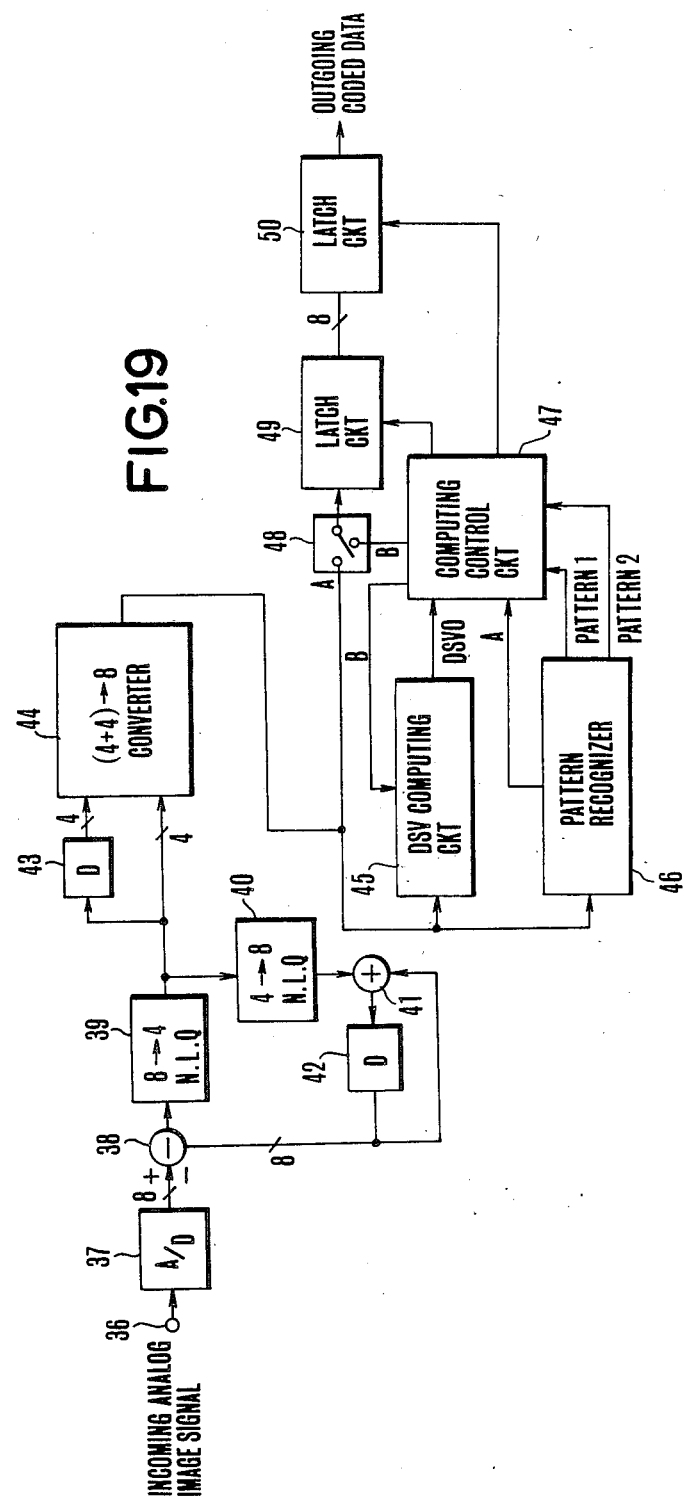
FIG. 19 is a block diagram showing a predictive encoder arranged according to this invention as a third embodiment thereof.

FIG. 19 shows an encoder, which is arranged as a third embodiment thereof as described below:

A terminal 36 is arranged to receive an analog image signal, such as a video signal. An A/D converter 37 converts the analog image signal into digital image data consisting of eight bits. The 8-bit digital data is supplied to the positive input terminal of a subtractor 38. To the negative input terminal of the subtractor 38 is supplied 8-bit prediction data from a predictor 42. The subtractor 38 produces a prediction error date which consists of eight bits.

The 8-bit prediction error data from the subtracter 38 is non-linearly quantized by a non-linear quantizer 39 into difference data of four bits according to the characteristic mentioned in the foregoing. The difference data produced from the non-linear quantizer 39 is supplied in a state of 8-bit parallel trains of difference data to a data converter 44 together with difference data which has been delayed a by a one-data-period delay circuit 43. The converter 44 then convert it, in accordance with the concept described in the foregoing, into a converted data of eight bits having a bit pattern in which the DC and low frequency components are suppressed.

Meanwhile, the difference data produced from the non-linear quantizer 39 is supplied also to a representative value setter 40 of a characteristic reverse to that of the non-linear quantizer 39 which non-linearly quantizes the 4-bit signal into an 8-bit signal. The representative value setter 40 forms a known local decoder jointly with an adder 41 and a predictor 42. The setter 40 receives 8-bit prediction error data from the predictor 42 and supplies it to the negative input terminal of the subtractor 38 for the purpose of preventing accumulation of the quantization error of the prediction error signal.

The 225 kinds of converted data obtained by the data converter 44 are supplied to the terminal A of a switch 48, a DSV computing circuit 45 and a pattern recognizer 46.

Figure 22:
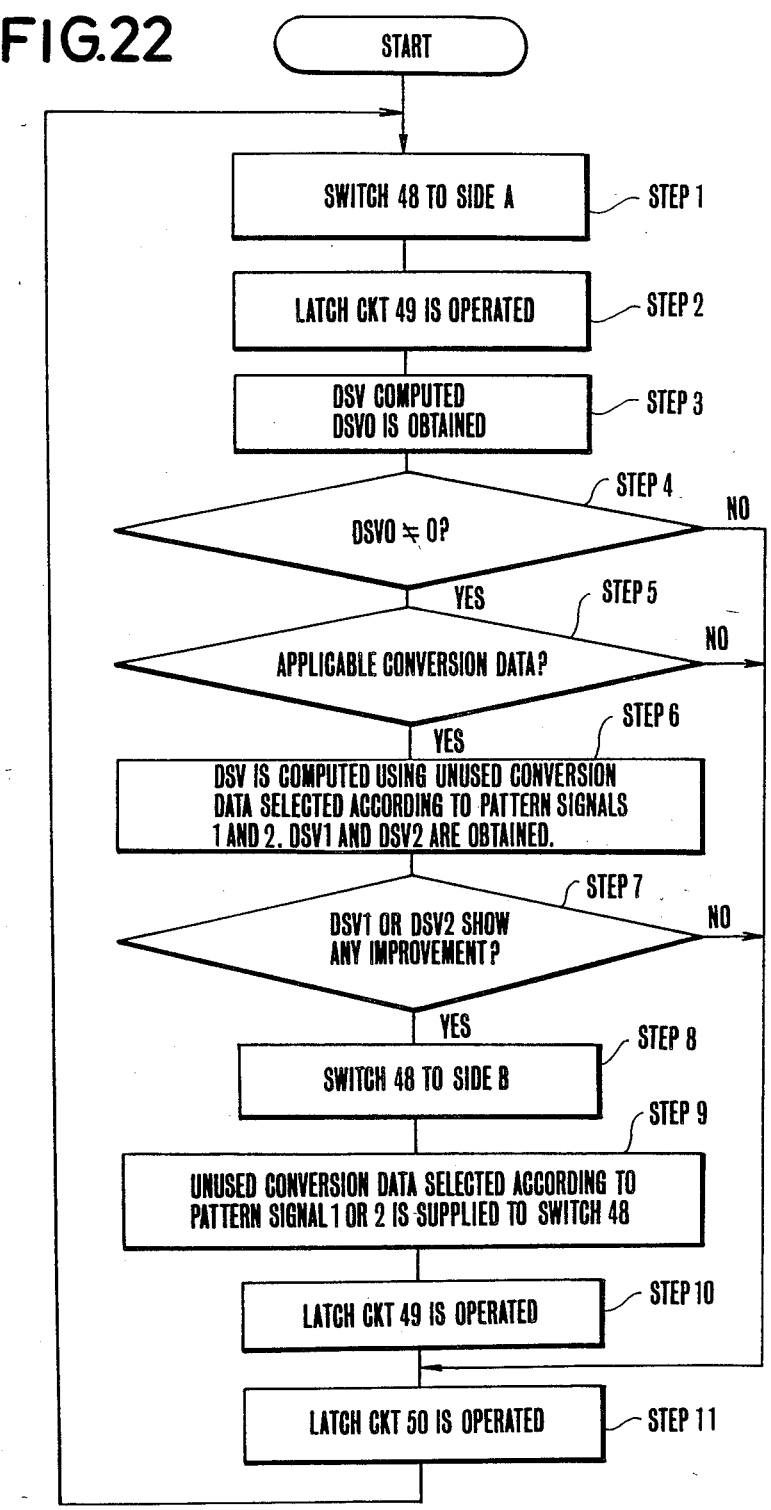
FIG. 22 is a flow chart showing the operation of the predictive encoder of FIG. 19.

The DSV computing circuit 45 is arranged to compute variations in the DC component by accumulating the number of "1" and that of "O" included in the conversion data signal which has been received up to the present. A signal DSVO which represents the result of this computation is supplied to a computing control circuit 47. The circuit 47 is arranged to perform control by according to control procedures as shown in FIG. 22.

The pattern recognizer 46 is arranged to find whether or not the 8-bit conversion data produced from the data converter 44 corresponds to one of 31 conversion data which are unused among the 256 kinds of conversion data as they have bit patterns of large absolute CDS values as mentioned in the foregoing. In this case, considering the general characteristic of an image signal, 31 points including the above stated areas (i, j)=(−2 to +2, −2 to +2), (±3, 0), (0, ±3), (3, 3) and (−3, −3) are selected, for example, as the conversion data to which the unused conversion data are allotted. It is preferable to have the bit patterns of the 31 conversion codes allotted to the extraction points of FIG. 20 in such a way as to have CDS values of opposite polarities alternately allocated.

Further, the conversion data to be discriminated at the pattern recognizer 46 is not limited to such data that is arranged to have one unused conversion data allotted to one conversion data but may be some other data that is arranged to have a plurality of unused conversion data allotted to one conversion data. In other words, arrangement to allot positive and negative unused conversion data of the same CDS absolute value to the conversion data makes it possible to have some unused conversion data that is closest to zero in terms of SDV adequately selected for allotment from among unused conversion data.

Figure 21:
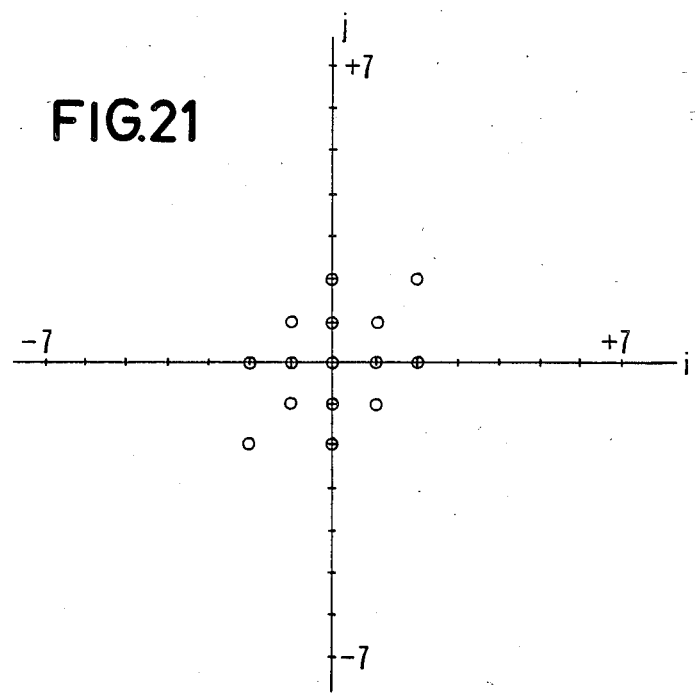

FIG. 21 shows extraction points at which the conversion data to which two unused conversion data are to be allocated. The conversion data having the allotment are 15 conversion data including the difference data pairs (i, j)=(−2 to +2, −2 to +2), (±2, 0), (0, ±2), (2,2) and (−2, −2) obtained before conversion by the data converter 44. Among unused conversion data, 30 unused conversion data are applicable to them. However, in addition to them, one of the remaining unused conversion data may be allotted to another conversion data located in the neighborhood of the 15 conversion data.

Assuming that the pattern recognizer 46 of FIG. 19 is arranged to allot a plurality of unused conversion data to one conversion data, the details of the pattern recognizer are as described below:

When the conversion data supplied to the pattern recognizer is discriminated as conversion data to which a plurality of unused conversion data are to be allotted, the pattern recognizer 46 supplies a computing control circuit 47 with a recognizing signal A which is indicative of the result of discrimination and pattern signals 1 and 2 which are indicative of the patterns of two unused conversion data and are to be used for controlling the DSV corresponding to the conversion data received. The computing control circuit 47 is arranged, as will be further described later with reference to a flow chart, to supply a DSV correction output signal B, a pattern signal which indicates the pattern of unused conversion data for controlling the DSV selected and a latch control pulse signal respectively to a DSV computing circuit 45, to the input terminal B of a switch circuit 48 and to latch circuits 49 and 50. The control operation of the computing control circuit 47 is as described below with reference to FIG. 22 which shows it in a flow chart:

Referring to FIG. 22, the connecting position of the switch 48 is shifted to one side A thereof at a step 1. At a step 2: A latch operation pulse signal is supplied to a latch circuit 49 at the timing as shown at a part a in FIG. 23. Then, the conversion data produced from the data converter 44 is latched. At a step 3: A signal DSVO which indicates the DSV value of the conversion data train produced at this point of time from the data converter 44 is obtained from the DSV computing circuit 45. AT a step 4: A discrimination is made as to whether or not the DSV value indicated by this signal DSVO is "0". If the DSV value is found to be "0", the control operation comes to a step 11. At the step 11: A latch circuit 50 is activated by means of a pulse signal which is next generated as shown at a part d in FIG. 23. The conversion data produced from the latch circuit 49 is latched at the latch circuit 50.

Meanwhile, if the DSV value is found to be not "0" at the step 4, the flow of control operation proceeds to a step 5. At the step 5: A check is made to find, on the basis of the discrimination signal A from the pattern recognizer 46, whether or not the conversion data latched at the latch circuit 49 is the conversion data to which unused conversion data for controlling the DSV is to be allotted. If not, the flow comes to the step 11 to actuate the latch circuit 50 at the timing of pulses shown at the part d of FIG. 23. If so, the flow proceeds to a step 6. At the step 6: Unused conversion data selected according to the applicable pattern signals 1 and 2 are added to a DSV value obtained from the signal DSVO produced one data period before from the DSV computing circuit 45. By this, DSV values DSV1 and DSV2 are computed for unused conversion data.

At a step 7: Next, the DSV value of the present signal DSVO is compared with these computed DSV values DSV1 and DSV2. Then, a check is made to see if the value DSV1 or DSV2 would give a better DSV suppressing effect for bringing the DSV value closer to zero than the present DSV value. If both of them (DSV1 and DSV2) are found to have no such effect, the flow comes to the step 11. If they are found to have a better effect, the flow proceeds to a step 8. At the step 8: The connecting position of the switch 48 is shifted to one side B thereof. At a step 9: The unused conversion data which corresponds to the effective pattern signal 1 or 2 is supplied to an input terminal disposed on the side B of the switch 48.

Figure 23:
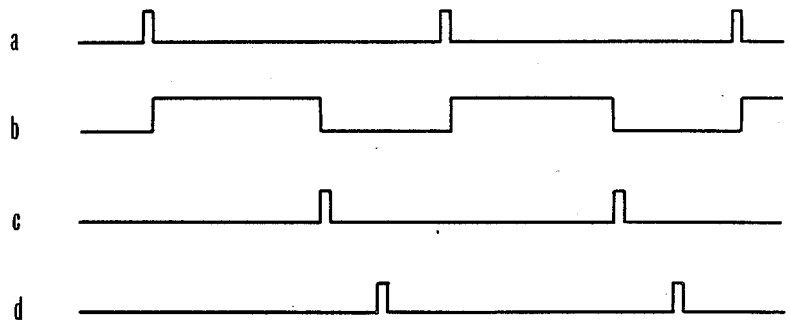
FIG. 23 is a timing chart showing the operation of the essential parts of the predictive encoder of FIG. 19.

Following that, a latch pulse signal is applied to the latch circuit 49 at the timing of pulses shown at a part c of FIG. 23 to latch thereby the unused conversion data which corresponds to the code pattern signal 1 or 2 and comes from the switch 48. After that, at the step 11, the latch circuit 50 is activated at the timing of pulses shown at the part d of FIG. 23 in such a way as to have the unused conversion data from the latch circuit 49 latched there.

Referring again to FIG. 23, the high level period of a wave form shown at a part b corresponds to a period during which the computing control circuit 47 performs the computing and discriminating actions of steps 3 to 9.

This embodiment is arranged by way of example to convert two consecutive 4-bit quantized difference value signals into an 8-bit coded signal. However, in accordance with this invention, this arrangement may be changed to convert an m number of consecutive n-bit quantized difference value signal into a coded signal consisting of an m×n number of bits. In that instance, the DC-component and low-frequency-component suppressing effect of the encoder can be further increased.

In the embodiment described, one or two unused conversion data are allotted to one conversion data for the purpose of suppressing the DSV. However, the invention is not limited to this and the arrangement may be changed to allot three or more than three unused conversion data instead of one or two. Such a modification further enhances the DSV suppressing effect.

Figure 20:
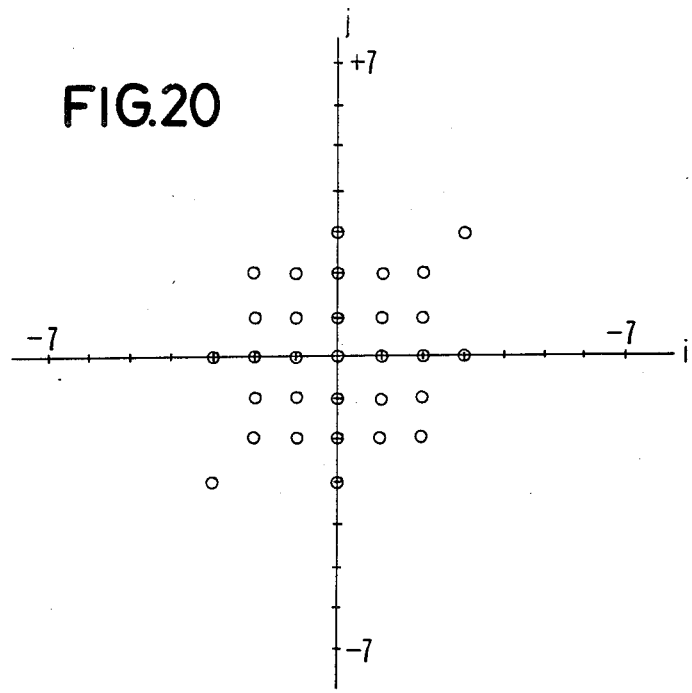
FIGS. 20 and 21 shows the distribution of specific combinations among combinations of two-consecutive quantized difference value data obtained after non-linear quantization performed by the predictive encoder of FIG. 19.

Further, in the case of FIGS. 20 and 21, any change to a high DSV value is positively controlled to be lowered by allotting the unused conversion data for DSV control to conversion data of a relatively high rate of occurrence frequency. However, the same effect is also attainable by allotting the DSV-controlling unused conversion data to conversion data of a relatively low rate of occurrence frequency in such a way as to prevent occurrence of a change in the DSV value.

Further, the embodiment is arranged for NRZ modulation. However, the same advantageous effect is of course attainable in the event of carrying out NRZI modulation.

Figure 24:
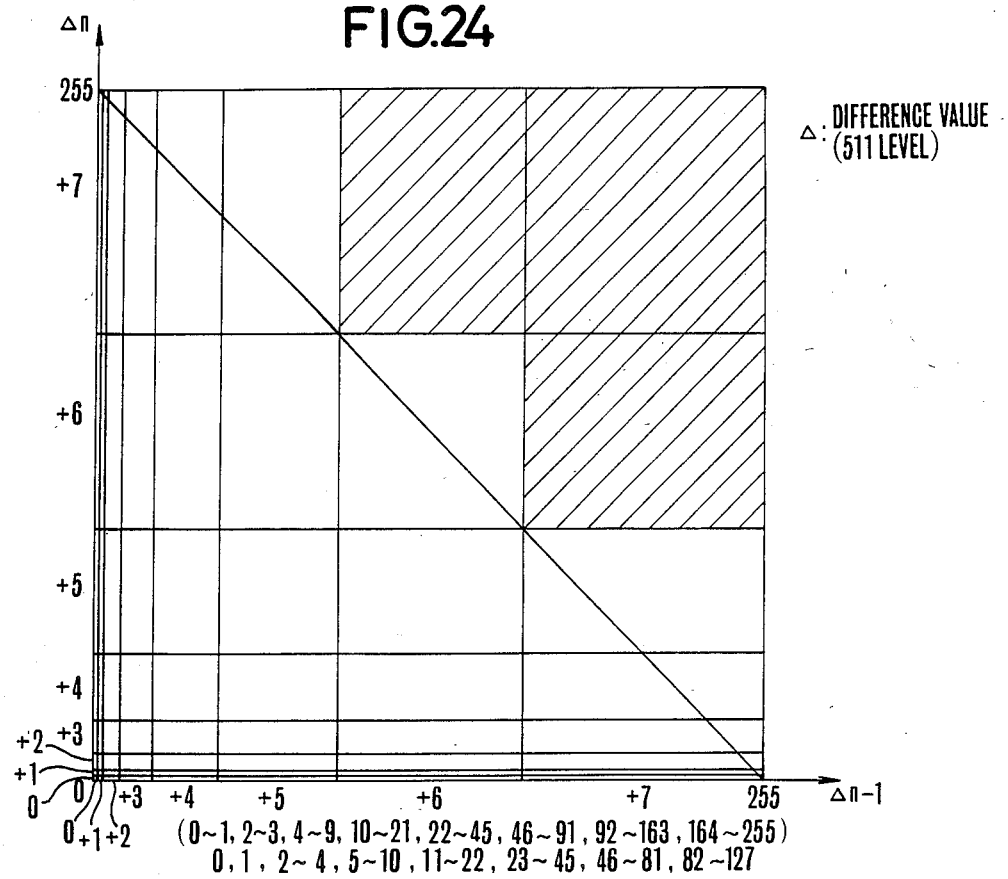
FIG. 24 shows by way of example some combinations which do not actually occur among possible combinations of two-consecutive quantized difference value data after non-linear quantization by the predictive encoder of FIG. 19.

Referring to FIG. 24, the DSV suppressing effect can be enhanced by using, also as the DSV-controlling unused conversion data, the conversion codes allotted to the non-occurrence parts (hatched parts in the drawing) of the areas (i, j). In the case of FIG. 24, a total of six conversion data is usable as the unused conversion data including a third quadrant. Further, in accordance with this concept, with the mid-tread type non-linear quantization can be replaced, for example, with mid-riser type non-linear quantization using a total of 256 conversion data including (i, j) (i= −8, −7, ---, −1, 1, --- 8 and j= −8, −7, ---, −1, 1, ---, 8) with non-occurrence conversion data among the 256 conversion data arranged to be used as the DSV-controlling unused conversion data in accordance with this invention.

Figure 25:
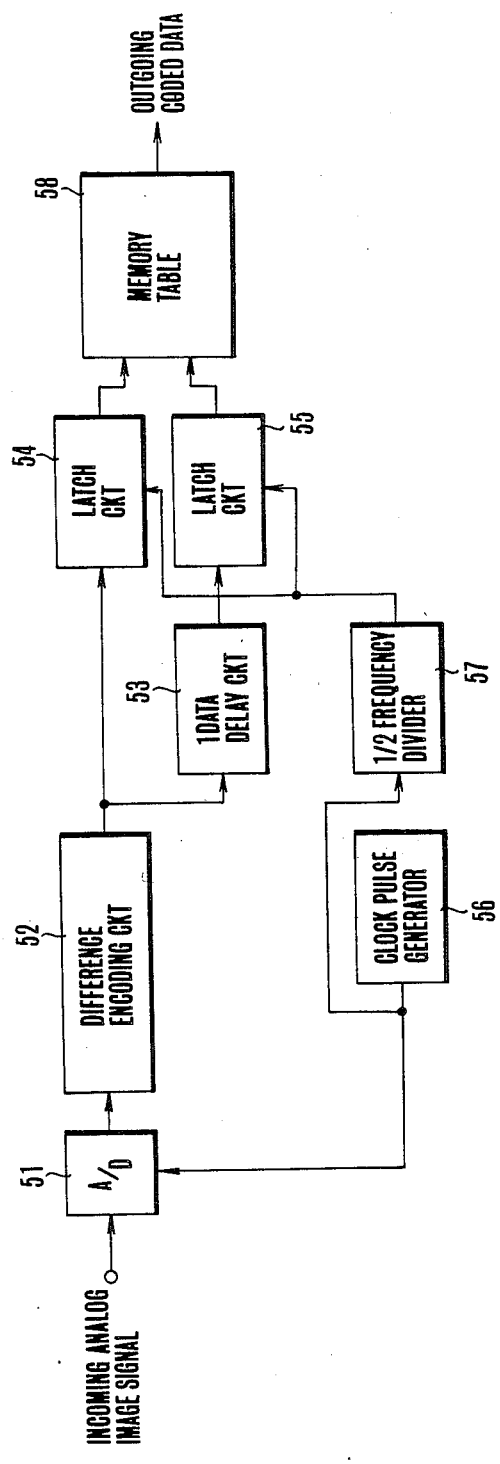
FIG. 25 is a block diagram showing a predictive encoder arranged as a fourth embodiment of this invention.

FIG. 25 shows in outline the arrangement of a fourth embodiment of this invention. The details of the fourth embodiment is as follows: Referring to FIG. 25, an incoming analog image signal is supplied to an A/D converter 51 which is arranged to operate under the control of a clock pulse signal which is generated by a clock pulse generator 56 as shown at a part (a) in FIG. 26. The incoming analog image signal is converted by the A/D converter 51 into an 8-bit digital image signal. The digital image signal is supplied to a difference encoding circuit 52. The circuit 52 is arranged in a known manner to non-linearly quantize difference data indicative of a difference between the 8-bit input information data and representative value data and to produce it, for example, in the form of 4-bit difference information data. In this instance, the 8-bit information data is thus compressed into the 4-bit difference information data. The representative value data is obtained by prediction on the basis of a previous value or the like using preceding information data received immediately before the input information data.

Figure 26:
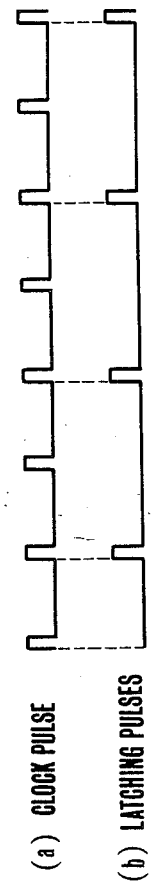
FIG. 26 is a timing chart showing the latching action of a latch circuit included in the predictive encoder of FIG. 25.

The 4-bit difference information data which is thus obtained is supplied to latch circuits 54 and 55 via a one-data delay circuit 53. The one-data delay circuit 53 is arranged to delay the 4-bit difference information data to a degree corresponding to a one-data input period. The latch circuits 54 and 55 is arranged to perform their latching actions according to a latch pulse signal obtained by frequency dividing the clock pulses (see the part (a) of FIG. 26) of the clock pulse generator 56 to ½ as shown at a part (b) of FIG. 26. As shown in FIG. 26, one latch pulse (b) is generated for every two clock pulses (a). Therefore, the 4-bit difference information data coming from the difference encoding circuit 52 is produced and supplied to a memory table 58 in the form of 8 bit data and as a sum of two data.

Conversion data to be stored at the memory table 58 is arranged as follows: The memory table 58 is arranged to retain conversion data which corresponds to the pattern of the 8-bit data obtained in the above stated manner. Using the 8-bit data as an address data, the conversion data is read out and produced from the memory table 58. However, since the address consists of a combination of the 4-bit difference information data as mentioned above, there are some non-occurring combinations.

Figure 27A:
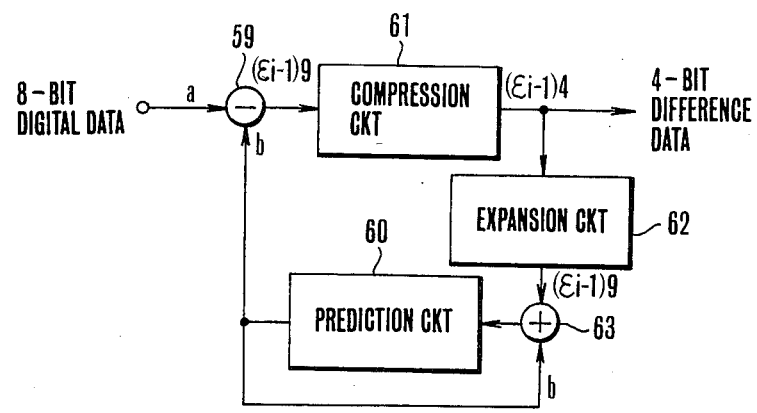
FIGS. 27(a) and 27(b) show an example of arrangement of a difference encoding circuit included in the predictive encoder of FIG. 25.
Figure 27B:
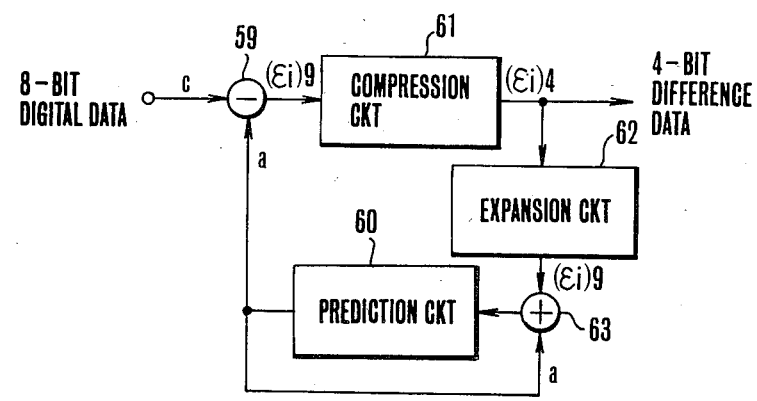

FIGS. 27(a) and 27(b) show by way of example the details of the difference encoding circuit of FIG. 25.

Referring first to FIG. 27(a), the incoming 8-bit image data a has $-127$ to $+127$ levels including "0". The 8-bit image data a is supplied to a subtracter 59. Meanwhile, the subtracter 59 also receives an 8-bit prediction data b which is produced from a prediction circuit 60. This prediction data b also has $-127$ to $+127$ levels including "0". The prediction data b is subtracted from the image data a. The subtracter 59 then produces, as a result of this subtraction, a 9-bit subtraction data $(Ei-1)9$, which is supplied to a compression circuit 61. The range of values within which the subtraction data $(Ei-1)9$ is obtainable is from $-254$ to $+254$.

Assuming that the value of the image data (or information data) a is $+127$ and that of the prediction data b $-127$, the value of the subtraction data $(Ei)9$ becomes $a-b=(+127)-(-127)=(+254)$. The subtraction data $(Ei-1)9$ is compressed by the compression circuit 61 and is produced as 4-bit difference data $(Ei-1)4$ from the circuit 61. The difference data $(Ei-1)4$ is supplied to an expansion circuit 62 to be brought back into the original subtraction data $(Ei-1)9$. The output of the expansion circuit 62 is supplied to an addition circuit 63 to be added to the prediction data b produced from the prediction circuit 60. In other words, the addition circuit 63 produces the prediction data b +the reduction data $(Ei-1)9=(-127)+(+254)=(+127)=$ information data (or image data) a. If the prediction circuit 60 is of the kind making prediction on the basis of a previous value, the image data a is produced as the prediction data.

Referring to FIG. 27(b), when 8-bit information data c is supplied, the subtracter 59 performs a subtracting operation this time on the information data c and the prediction data a. However, since the information data c also has $-127$ to $+127$ different levels including "0", the value of subtraction data $(Ei)9$ is from "0" to $-254$. Therefore, the value of the subtraction data $(Ei)9$ never becomes larger than "0".

Figure 28:
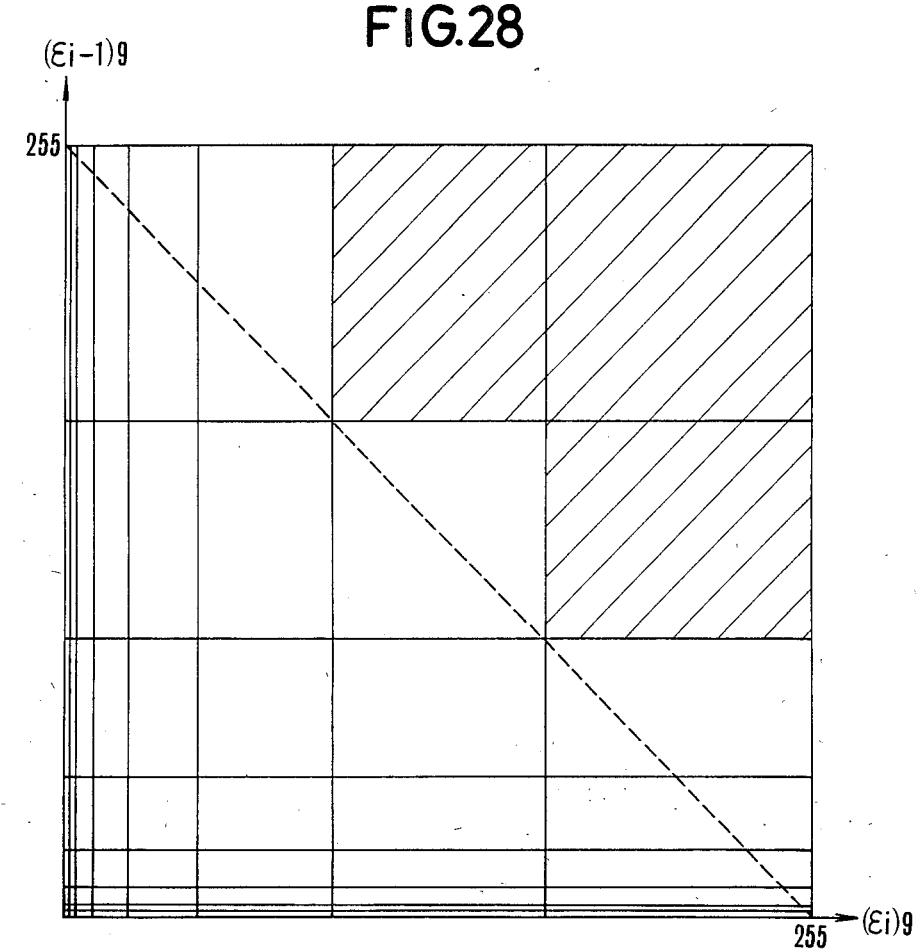
FIG. 28 shows a combination pattern of subtraction data $(Ei-1)9$ and $(Ei)9$ shown in FIGS. 27(a) and 27(b).

FIG. 28 shows combinations of the subtraction data $(Ei-1)9$ and $(Ei)9$ with the former taken on the axis of ordinate and the latter on the axis of abscissa. In the case of this illustration, however, the levels of both the subtraction data $(Ei-1)9$ and $(Ei)9$ are from 0 to $+255$. There are different cases where the levels of the data (Eil)9 and those of the data $(Ei)9$ are respectively from 0 to $+255$ and from $-255$ to 0 or from $-255$ to 0 and from 0 to 255 or both of them are from $-255$ to 0. However, these different cases are excluded from the following description:

Referring to FIG. 28, combinations shown above a broken line never occurs as mentioned in the foregoing. The illustration is divided into a grid-like shape. Each of the divisions represents a combinations of the difference data $(Ei-1)4$ and $(Ei)4$ obtained by compressing the 8-bit subtraction data $(Ei-1)9$ and $(Ei)9$ by the compression circuit 61 of FIG. 27(a) into the 4-bit difference data $(Ei-1)4$ and $(Ei)4$ and by non-linearly dividing the levels "0" to $+255$ of the subtraction data $(Ei-1)9$ and $(Ei)9$ into eight to express them in the levels 0 to $+7$ of the difference data $(Ei-1)4$ and $(Ei)4$. In other words, the non-occurring combinations of the difference data $(Ei-1)4$ and $(Ei)4$ which are located above the broken line are represented by hatched parts of FIG. 28. The combination of $(Ei-1)4$ and $(Ei)4$ becomes the combinations of levels (7, 7), (7, 6) and (6, 7). Further, in case where the subtraction data $(Ei-1)9$ and $(Ei)9$ both consist of levels from $-255$ to 0, the non-occurring combinations of difference data $(Ei-1)4$ and $(Ei)4$ are level combinations of $(-7, -7)$, $(-7, -6)$ and $(-6, -7)$.

At the memory table 58, the above stated combination of difference data is never supplied in the form of 8-bit address data. Therefore, the memory table does not require allocation of any conversion data that corresponds to such address data. The embodiment thus permits deduction of a number of memories for the conversion data which will never be allotted.

Further, compared with the patterns of the address data supplied, the pattern of the conversion data are greater in number. Therefore, with unallotted conversion data assumed to be patterns including the low frequency component in a greater amount, data conversion can be accomplished with a greater low frequency zone compressing effect by arranging such patterns not to be stored at the memory table.

Further, the unallotted conversion data may be utilized, for some other purposes, such as controlling the DSV, detecting errors, etc.

What is claimed is:

1. An encoder for encoding an image signal by digitizing said signal, comprising:
   (a) sample signal forming means for forming sample signals by receiving and serially sampling said image signal;
   (b) coded data forming means arrived to form and produce coded data which corresponds to said sample signals formed by said temple signal forming means; and
   (c) data conversion means arranged to convert an m number (m: an integer which is at least 2) of coded data output from said coded data forming means into data consisting of the same number of bits as the total number of bits of said m number of coded data and having another bit pattern.

2. An encoder according to claim 1, wherein said sample signal forming means includes an analog-to-digital converter which is arranged to sample, at a predetermined frequency, said image signal received to obtain said sample signal and to produce sample data consisting of a k number of bits (K: a positive integer).

3. An encoder according to claim 2 wherein said coded data forming means includes a predicted difference encoding circuit which is arranged to form predicted difference coded data as said coded data consisting of an l number of bits (l: a positive integer smaller than k) from said sample data of k bits produced from said analog-to-digital converter and to serially produce said predicted difference coded data.

4. An encoder according to claim 1, wherein said data conversion means includes a delay circuit which is arranged to simultaneously produce said m number of coded data serially received from said coded data forming means.

5. An encoder for encoding an image signal by digitizing said signal, comprising:
   (a) a sample signal forming means for forming sample signals by receiving and serially sampling said image signal;
   (b) coded data forming means for forming and outputting coded data consisting of l number of bits (l: a positive integer) corresponding to said sample signal formed by said sample signal forming means; respectively;
   (c) delaying means for simultaneously outputting m number of coded data (m: an integer more than 3) serially received from said coded data forming means; and
   (d) memory means which is arranged to store conversion data consisting of the same number of bits as the total number of bits of said m number of coded data received from said delay means and having another bit pattern by arranging said stored conversion data to a correspond to the bit pattern of said m number of coded data, and which is arranged to output said conversion data which corresponds to the bit patterns of said m number of coded data received from said delay means.

6. An encoder according to claim 5, wherein said memory means is arranged to store said conversion data in different kinds not exceeding $2^{m \cdot l}$ kinds.

7. An encoder according to claim 6, wherein said memory means does not store any conversion data corresponding to bit patterns which never actually take place among the bit patterns of said m number of coded data produced from said delay means.

8. An encoder according to claim 6, wherein said memory means is arranged to store only $2^{m \cdot l} - n$ kinds of conversion data that have bit patterns wherein bits denoting "o" or "1" are briefly consecutive among the $2^{m \cdot l}$ bit patterns.

9. An encoder for encoding an image signal by digitizing said signal, comprising:
   (a) sample signal forming means for forming sample signals by receiving and serially sampling said image signal;
   (b) difference coded data forming means arranged to form a difference value signal representing a difference between adjacent sample signals formed by said sample signal forming means and to form difference coded data by quantizing and encoding said difference value signal; and
   (c) data conversion means arranged to convert an m number (m: an integer which at least 2) of said difference coded data produced from said difference coded data forming means into data which consists of the same number of bits as the total number of bits of said m number of difference coded data and has a bit pattern including little DC component according to the characteristic of said image signal.

10. An encoder according to claim 9, wherein said difference coded data forming means includes a quantizing circuit having a mid-tread type quantizing characteristic.

11. An encoder for encoding an image signal by digitizing said signal, comprising:
    (a) sample signal forming means for forming sample signals by receiving and serially sampling said image signal;
    (b) difference coded data forming means arranged to form a difference value signal representing a difference between adjacent sample signals by said sample signal forming means and to form difference coded data by quantizing and encoding said difference value signal; and
    (c) memory means which is arranged to store conversion data consisting of the same number of bits as the total number of bits of m number of bits of said difference coded data (m: an integer more than 2) and having a bit pattern including little DC component outputted from said difference coded data forming means in the state to correspond to the bit pattern of said m difference coded data and to output said conversion data corresponding to the m difference coded data fed from said difference coded data forming means.

12. An encoder according to claim 11, wherein said memory circuit is arranged to store said conversion data in such a manner that the amount of DC components in the bit patterns of conversion data corresponding to the bit patterns of said m number of difference coded data produced from said difference coded data forming means decreases according as the occurrence frequency of the corresponding bit patterns increases.

13. An encoder according to claim 11, wherein said memory circuit is arranged not to store any conversion data corresponding to such bit patterns that never occur among the bit patters of said m number of difference coded data produced form said difference coded data forming means.

14. An encoder according to claim 11, wherein said difference coded data forming means is arranged to form and produce difference coded data consisting of an l number of bits (l: a positive integer).

15. An encoder according to claim 14, wherein said memory means stores a number of kinds of conversion data less than $2^{m \cdot l}$ kinds.

16. An encoder for encoding an image signal by digitizing said signal, comprising:
    (a) sample signal forming means for forming sample signals by receiving and serially sampling said image signal;
    (b) coded data forming means arranged to form and produce coded data corresponding respectively to said sample signals formed by said sample signal forming means;
    (c) data conversion means for converting an m number of coded data (m: an integer which is at least 2) outputted from said coded data forming means into a first data having the same number as the total number of said m number of coded data and having a another bit pattern;
    (d) DSV detection means arranged to detect changes in the digital sum value (DSV) of a series of said first data produced from said data conversion means; and
    (e) DSV control means arranged to replace, according to the result of detection made by said DSV detection means, said first data with second data which has the same number of bits as said first data but differs in bit pattern from said first data and to produce said second data instead of said first data.

17. An encoder for encoding an image signal by digitizing said signal, comprising:
(a) sample signal forming means for forming sample signals by receiving and serially sampling said image signal;
(b) coded data forming means arranged to form and produce coded data corresponding respectively to sample said signals formed by said sample signal forming means;
(c) memory means arranged to store the first data having the same number of bits as the total number of a m number of coded data (m: an integer more than 2) outputted from said coded data forming means and having another bit pattern of said m coded data and to output said first data corresponding to the m coded data outputted from said coded data forming means;
(d) DSV detection means arranged to detect changes in the digital sum value (DSV) of a series of said first data produced from said memory means; and
(e) DSV control means arranged to replace, according to the result of detection made by said DSV detection means, said first data with second data which has the same number of bits as said first data but differs in bit pattern from said first data and to produce said second data instead of said first data.

18. An encoder according to claim 17, wherein said coded data forming means includes a difference encoding circuit arranged to form and produce, as said coded data, difference coded data which consists of an l number (l: a positive integer) of bits and corresponds to each of said sample signals formed by said sample signal forming means.

19. An encoder according to claim 18, wherein said memory means is arranged not to store a portion of said first data correspond to any bit patterns that never occurs among the bit patterns of said m number of difference coded data produced from said difference encoding circuit.

20. An encoder according to claim 18, wherein said memory means is arranged to store a number of kinds of said first conversion data which is less than $2^{m \cdot l}$ kinds.

21. An encoder according claim 19, wherein said DSV control means includes:
(a) a second data generating circuit arranged to be capable of generating a second data which has the same bit patterns as such bit patterns that are not stored by said memory means; and
(b) a change-over circuit arranged to replace said first data produced from said conversion means with said second data which is produced from said second data generating circuit.

22. An encoder according to claim 21, wherein said second data generating circuit is arranged to generate said second data in case that a predetermined kind of said first data is produced from said data conversion means when the DSV value detected by said DSV detection means reaches a predetermined value.

23. An encoder according to claim 21, wherein said second data generating circuit is arranged to produce, according to the result of detection made by said DSV detection means, said second data with such bit patterns that brings said DSV value close to said predetermined value.

24. An encoder according to claim 21, wherein said second data generating circuit is arranged to be capable of generating a plurality of kinds having different bit patterns in relation to predetermined kinds of said first data.

25. An encoder according to claim 21, wherein said second data generating circuit is arranged to generate said second data in relation to the kinds of said first data which are produced from said memory means and have high degrees of occurrence frequency.

26. An encoder for encoding an image signal by digitizing said signals, comprising:
(a) sample signal forming means for forming sample signals by receiving and serially sampling said image signal;
(b) coded data forming means arranged to form and produce coded data corresponding respectively to said sample signals formed by said sample signal forming means;
(c) data conversion means arranged to convert an m number of coded data (m: an integer which is at least 2) outputted from said coded data forming means into a data having the same number of bits as the total number of bits of said m number of coded data and having another bit pattern; and
(d) control means for controlling the data converting action of said data conversion means in such a way as to bring the digital sum value (DSV) of a series of said data produced from said data conversion means close to a predetermined value.

27. An encoder according to claim 26, wherein said coded data forming means is arranged to form and produce coded data which consists of an l number (l: a positive integer) of bits.

28. An encoder for encoding an image signal by digitizing said signal, comprising:
(a) sample signal forming means for forming sample signals by receiving and serially sampling said image signal;
(b) coded data forming means for forming and outputting coded data of l bits (l: a positive integer) corresponding to said sample signals formed by said sample signal forming means;
(c) data conversion means for outputting a first data of m·l bits of $(2^{m \cdot l} - n)$ kinds (n: a positive integer or a second data of m·l bits of n kinds which differ from the kinds of said first data, according to an m number of coded data (m: an integer which is at least 2) outputted from said coded data forming means; and
(d) control means for controlling the data converting action of said data conversion means in such a way as to bring the digital sum value (DSV) of a series of said first or second data produced from said data conversion means close to predetermined value.

29. An encoder according to claim 28, wherein said control means is arranged to instruct said data conversion means to selectively produce either said data or said second data.

30. An encoder according to claim 28, wherein said first data is arranged to have a smaller value of the code work digital sum (CDS) within said m·l bits than that of said second data.

* * * * *

UNITED STATES PATENT AND TRADEMARK OFFICE
CERTIFICATE OF CORRECTION

PATENT NO. : 4,885,637

DATED : December 5, 1989

INVENTOR(S) : Akihiro Shikakura, et al.

It is certified that error appears in the above-identified patent and that said Letters Patent is hereby corrected as shown below: ON TITLE PAGE:

[54] Change "ENCODER" to -- IMAGE INFORMATION SIGNAL ENCODER --.

-- [30] Foreign Application Priority Data

July 26, 1986 [JP] Japan ----- 61-176158
July 26, 1986 [JP] Japan ----- 61-174728
July 26, 1986 [JP] Japan ----- 61-174729
July 26, 1986 [JP] Japan ----- 61-174730

Col. 1, line 53, change "error" to -- errors --.
Col. 1, line 65, change "necessitates" to -- necessitate --.
Col. 4, line 24, change "is" to --are--.
Col. 6, line 33, change "shows" to -- show --.
Col. 7, line 9, change "my" to -- may --.
Col. 7, line 13, change "/" to -- $\ell$ -- both instances
Col. 7, line 14, change "/" to -- $\ell$ --.
Col. 7, line 24, change "/" to -- $\ell$ --.
Col. 7, line 43, change "/" to -- $\ell$ --.
Col. 8, line 5, change "/" to -- $\ell$ --.
Col. 8, line 7, change "/" to -- $\ell$ --.
Col. 8, line 8, change "a" to -- an --.
Col. 8, line 34, change "/" to -- $\ell$ --.
Col. 10, line 7, change "vale" to -- value --.
Col. 11, line 11, change "x" to -- - --.
Col. 12, line 44, change "is" to -- are --.
Col. 12, line 57, change "+" to -- - --.
Col. 16, line 65, change "is" to -- are --.
Col. 18, line 2, change "occurs" to -- occur --.
Col. 18, line 4, change "combinations" to -- combination --.
Col. 18, line 47, change "arrived" to -- arranged --.
Col 18, line 49, change "temple" to -- sample --.
Col. 18, line 63, after "2", insert -- , --.
Col. 18, line 67, change "/" to -- $\ell$ --, both occurrences.
Col. 19, line 14, change "/" to -- $\ell$ --, both occurrences.

UNITED STATES PATENT AND TRADEMARK OFFICE
CERTIFICATE OF CORRECTION

PATENT NO. : 4,885,637             Page 2 of 2

DATED : December 5, 1989

INVENTOR(S) : Akihiro Shikakura, et al.

It is certified that error appears in the above-identified patent and that said Letters Patent is hereby corrected as shown below:

```
Col. 19,   line 27,   delete "a".
Col. 19,   line 57,   after "which" insert -- is --.
Col. 20,   line 12,   change "is" to -- are --.
Col. 20,   line 34,   change "patters" to -- patterns --.
Col. 20,   line 40,   change " / " to -- ℓ --, both occurrences.
Col. 20,   line 58,   delete "a".
Col. 21,   line 12,   change "a" to -- an --.
Col. 21,   lines 30 and 31, change " / " to -- ℓ --.
Col. 21,   line 42,   before "kinds" insert -- ℓ --
Col. 22,   line 33,   change " / " to -- ℓ --, both occurrences.
Col. 22,   line 41,   change " / " to -- ℓ --, both occurrences.
Col. 22,   line 46,   change " / " to -- ℓ --.
Col. 22,   line 62,   change "work" to -- word --.
```

Signed and Sealed this

Fourteenth Day of January, 1992

Attest:

HARRY F. MANBECK, JR.

*Attesting Officer*      *Commissioner of Patents and Trademarks*